US012474659B2

(12) United States Patent
Oya

(10) Patent No.: US 12,474,659 B2
(45) Date of Patent: Nov. 18, 2025

(54) IMAGE FORMING APPARATUS AND METHOD FOR CONTROLLING IMAGE FORMING APPARATUS

(71) Applicant: CANON KABUSHIKI KAISHA, Tokyo (JP)

(72) Inventor: Masashi Oya, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/645,039

(22) Filed: Apr. 24, 2024

(65) Prior Publication Data

US 2024/0361718 A1 Oct. 31, 2024

(30) Foreign Application Priority Data

Apr. 27, 2023 (JP) ................................. 2023-072911

(51) Int. Cl.
*G03G 15/00* (2006.01)

(52) U.S. Cl.
CPC ....... *G03G 15/502* (2013.01); *G03G 15/5062* (2013.01); *G03G 15/55* (2013.01); *G03G 2215/00721* (2013.01); *G03G 2215/00729* (2013.01); *G03G 2215/00734* (2013.01)

(58) Field of Classification Search
CPC ............. G03G 15/5016; G03G 15/502; G03G 15/5062; G03G 15/55; G03G 2215/00717; G03G 2215/00721; G03G 2215/00725; G03G 2215/00729; G03G 2215/00734; G03G 2215/00738; G03G 2215/00742
See application file for complete search history.

(56) References Cited

U.S. PATENT DOCUMENTS

2015/0192884 A1* 7/2015 Sone .................. G03G 15/5058 399/72
2016/0187828 A1* 6/2016 Fukami .................. G03G 15/55 399/81
2019/0166273 A1* 5/2019 Komazawa ........... G06F 3/1256
2019/0238686 A1* 8/2019 Sakatani ............ H04N 1/00005
2022/0365472 A1* 11/2022 Yano .................. G03G 15/1675
2022/0373955 A1* 11/2022 Mutsuno ............ G03G 15/5062

FOREIGN PATENT DOCUMENTS

JP 2019133020 A 8/2019

* cited by examiner

*Primary Examiner* — Carla J Therrien
(74) *Attorney, Agent, or Firm* — Canon U.S.A., Inc. IP Division

(57) ABSTRACT

An image forming apparatus includes a plurality of feeding decks each containing a recording sheet, a display unit, an image forming unit that forms an image on the recording sheet conveyed from one of the plurality of feeding decks, a scanning unit that scans the image formed by the image forming unit, one or more processors and one or more memories cooperating to perform control to display information about the plurality of feeding decks on the display unit and select a feeding deck from among the plurality of feeding decks based on a user instruction, and a diagnosis unit that diagnoses a defective part in the image forming unit based on the image formed on the recording sheet by the image forming unit, the recording sheet being conveyed from the selected feeding deck, the image being obtained by scanning by the scanning unit.

15 Claims, 16 Drawing Sheets

[IMAGE DIAGNOSIS] CONFIRM FEEDING DECK

IS IT OK TO START PRINTING ON SHEET(S) IN FEEDING DECK (6) APPROPRIATE FOR CHART PRINTING?

CANCEL

OK

IMAGE FORMING APPARATUS AND METHOD FOR CONTROLLING IMAGE FORMING APPARATUS

BACKGROUND

Field

The present disclosure relates to an image forming apparatus and a method for controlling an image forming apparatus.

Description of the Related Art

There is an image diagnostic technique for an image forming apparatus including a printing unit and an image scanning unit to perform diagnosis of a failure part in the apparatus by scanning a chart for diagnosis printed by the printing unit by the image scanning unit. Japanese Patent Application Laid-Open No. 2019-133020 discusses an example where a chart for diagnosis printed by a printing unit includes three types of regions, i.e., a printing region, a region which is a blank sheet that is not passed through the printing unit, and a blank data region that is passed through the printing unit. The chart for diagnosis including three types of regions for diagnosis is prepared to thereby reduce the number of steps for a user to take in selecting chart data depending on an item to be diagnosed.

However, the configuration discussed in Japanese Patent Application Laid-Open No. 2019-133020 does not include any means for notifying the user of a feeding deck containing a sheet appropriate for printing the chart for diagnosis. This necessitates a step for the user to determine the feeding deck containing a sheet appropriate for printing the chart for diagnosis. If the user inadvertently selects a feeding deck containing a sheet that is not appropriate for printing the chart for diagnosis, the user cannot obtain a correct result even if the diagnosis is carried out, which results in waste of time and effort.

SUMMARY

According to an aspect of the present disclosure, an image forming apparatus includes a plurality of feeding decks each containing a recording sheet, a display unit that displays information, an image forming unit configured to form an image on the recording sheet conveyed from one of the plurality of feeding decks, the image forming unit including a plurality of parts, a scanning unit that scans the image formed by the image forming unit one or more processors and one or more memories cooperating to perform control to display information about the plurality of feeding decks on the display unit, and select a feeding deck from among the plurality of feeding decks based on a user instruction, and a diagnosis unit configured to diagnose a defective part in the image forming unit based on the image formed on the recording sheet by the image forming unit, the recording sheet being conveyed from the selected feeding deck, the image being obtained by scanning by the scanning unit, wherein the one or more processors and the one or more memories cooperating to display a feeding deck containing a recording sheet appropriate for determination of the defective part on the display unit in a highlighted manner.

Further features of the present disclosure will become apparent from the following description of exemplary embodiments with reference to the attached drawings.

DESCRIPTION OF THE EMBODIMENTS

Figure 1:
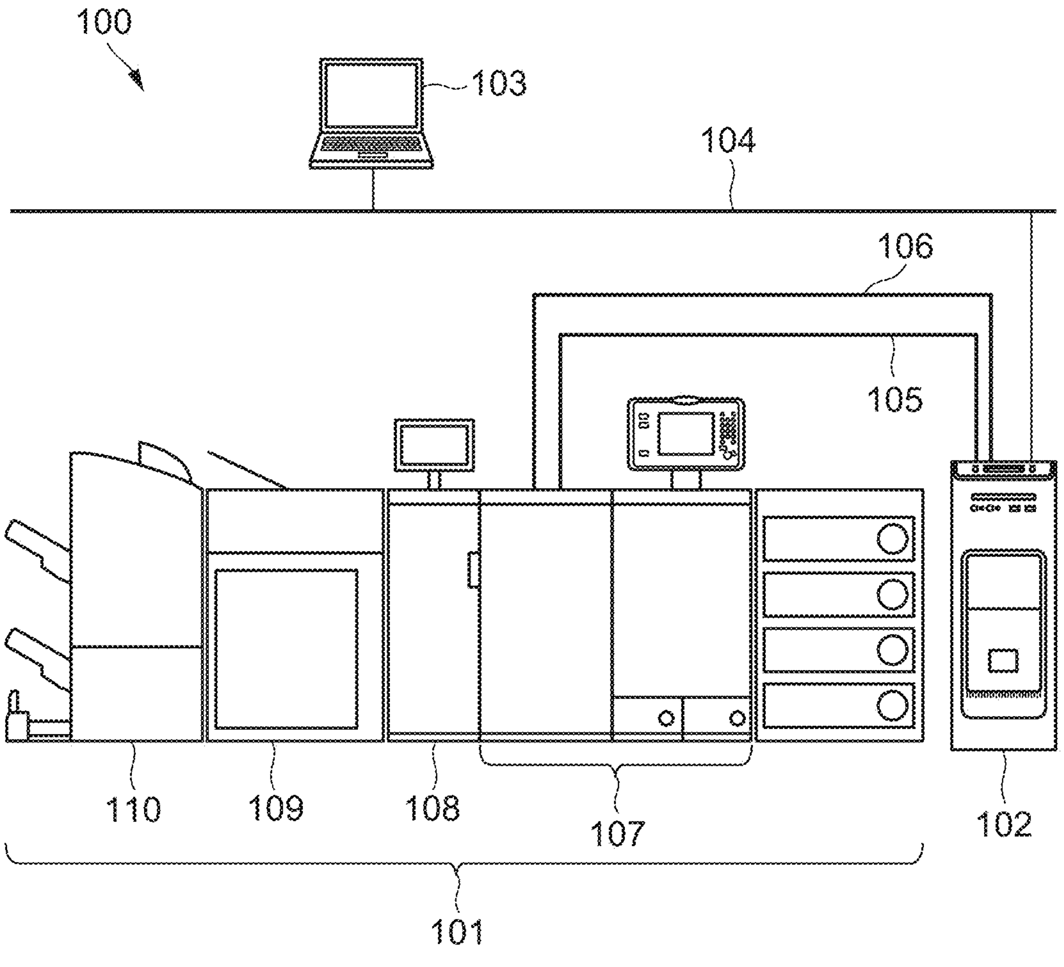
FIG. 1 illustrates a network configuration example including a printing system according to a first exemplary embodiment.

Exemplary embodiments of the present disclosure will be described in detail below with reference to the attached drawings. The following exemplary embodiments are not intended to limit the claimed disclosure, and not all combinations of features described in the exemplary embodiments are necessarily deemed to be essential. The same components are denoted by the same reference numerals, and descriptions thereof are omitted.

Overall System Configuration

FIG. 1 illustrates a network configuration example including a printing system (image processing system) according to a first exemplary embodiment. As illustrated in FIG. 1, a printing system 100 includes an image forming apparatus 101 and an external controller 102. The image forming apparatus 101 and the external controller 102 are communicably connected via an internal local area network (LAN) 105 and a video cable 106. The external controller 102 and a client personal computer (PC) 103 are communicably connected via an external LAN 104.

The client PC 103 is configured to issue a print instruction to the external controller 102 via the external LAN 104. A printer driver including a function of converting image data to be subjected to print processing into a page description language (PDL) that can be processed by the external controller 102 is installed on the client PC 103. A user who wishes to perform printing can issue a print instruction via the printer driver from various applications installed on the client PC 103 by operating the client PC 103. The printer driver transmits PDL data as print data to the external controller 102 based on the print instruction from the user. Upon receiving the PDL data from the client PC 103, the external controller 102 analyzes and interprets the received PDL data. Rasterization processing is performed based on an interpretation result and a bitmap image (print image data) with a resolution compatible with the image forming apparatus 101 is generated. Then, the print instruction is issued by inputting a print job to the image forming apparatus 101.

Next, the image forming apparatus 101 will be described. In the image forming apparatus 101, devices having different functions are connected to each other and are configured to perform complicated print processing, such as bookbinding.

The image forming apparatus 101 includes a printing unit 107 (image forming unit), a diagnosis unit 108, a stacker 109, and a finisher 110. Each module will be described below.

The printing unit 107 prints an image based on a print job and discharges a recording sheet on which the image is printed. The printed recording sheet discharged from the printing unit 107 is conveyed through the diagnosis unit 108, the stacker 109, and the finisher 110 in this order. In the present exemplary embodiment, the image forming apparatus 101 in the printing system 100 is an example of an image forming apparatus. However, the printing unit 107 included in the image forming apparatus 101 may be referred to as an image forming apparatus in some cases. The printing unit 107 forms (prints) an image with toner (coloring material) on the recording sheet supplied and conveyed from a feeding unit located at a lower portion of the printing unit 107.

The diagnosis unit 108 is a device configured to perform diagnosis to determine whether there is a defective part in the image forming apparatus 101 based on the printed recording sheet which has been conveyed through a conveyance path and on which the image has been printed by the printing unit 107. Specifically, the diagnosis unit 108 performs diagnosis based on a scanned image obtained by scanning the image printed on the conveyed printed recording sheet. The diagnosis of the defective part is determined by extracting a diagnosis region from the scanned image and checking a scanning signal value difference in the extracted diagnosis region. Detailed processing performed by the diagnosis unit 108 will be described below. The intended use of the diagnosis unit 108 is not limited to the above-described example.

The diagnosis unit 108 may also have an inspection function of inspecting whether a print defect is present on a printed recording sheet.

The stacker 109 is a device on which a number of printed recording sheets can be stacked. The finisher 110 is a device configured to execute finishing processing, such as stapling processing, punching processing, and saddle stich binding processing, on the conveyed printed recording sheets.

The recording sheets processed by the finisher 110 are discharged to a predetermined discharge tray.

In the configuration example illustrated in FIG. 1, the image forming apparatus 101 is connected to the external controller 102. The present exemplary embodiment can also be applied to a configuration different from this configuration example. For example, the image forming apparatus 101 may be connected to the external LAN 104, and print data may be transmitted from the client PC 103 to the image forming apparatus 101 without being passed through the external controller 102. In this case, data analysis and rasterization of the print data are executed by the image forming apparatus 101.

<Hardware Configuration of Image Forming Apparatus 101>

Figure 2:
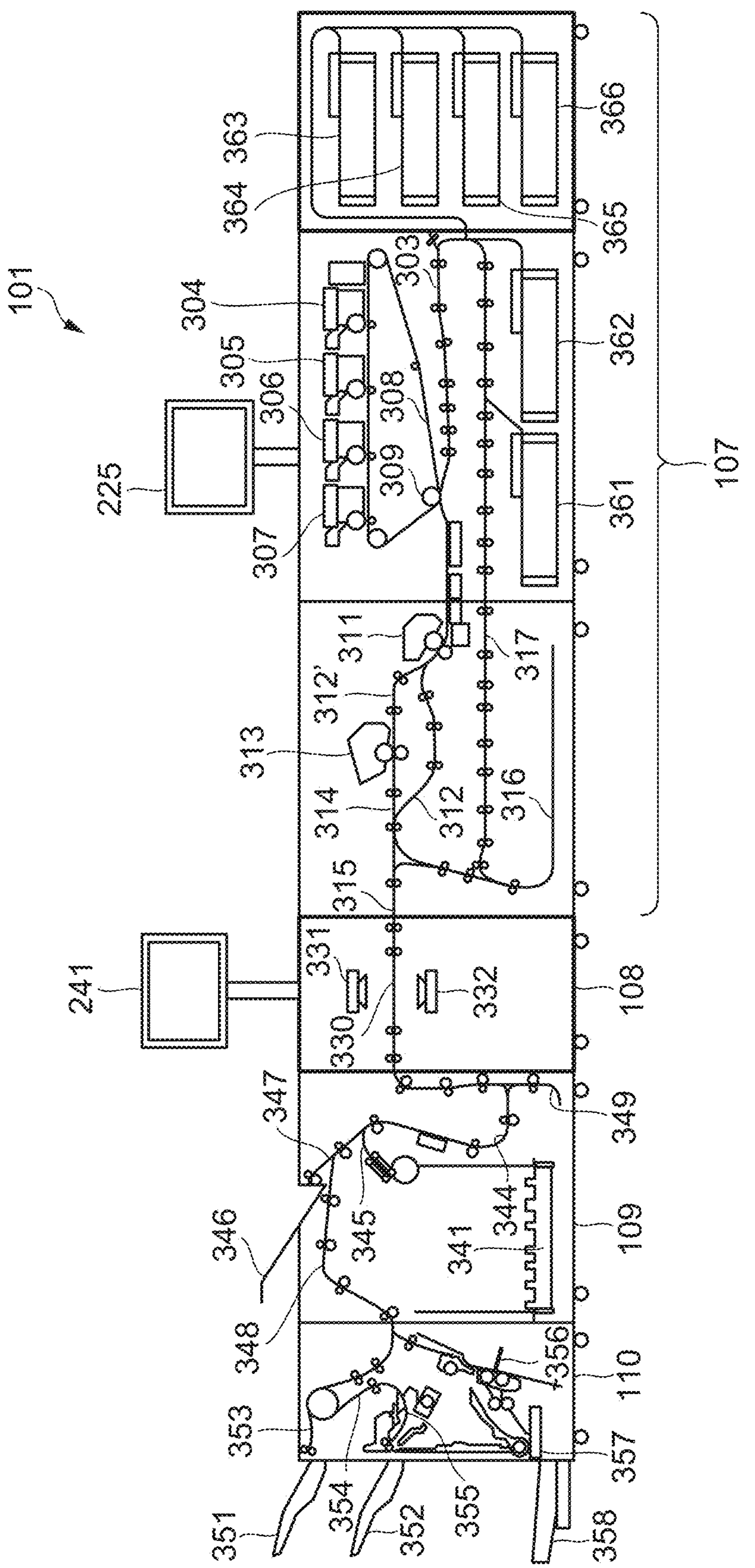
FIG. 2 is a sectional view illustrating a hardware configuration example of an image forming apparatus.

FIG. 2 is a sectional view illustrating a hardware configuration example of the image forming apparatus 101. A detailed operation example of the image forming apparatus 101 will be described below with reference to FIG. 2.

<Description of Feeding Decks>

The printing unit 107 includes a plurality of feeding decks. In the present exemplary embodiment, the printing unit 107 includes six types of feeding decks, i.e., feeding decks 361, 362, 363, 364, 365, and 366. The feeding decks 361, 362, 363, 364, 365, and 366 contain various types of recording sheets, respectively. Examples of the recording sheets include sheets of paper and overhead projector (OHP) sheets. A recording sheet located on top of the recording sheets contained in each feeding deck is separated one by one and is supplied to a conveyance path 303. Sheet information about the sheets contained in each feeding deck is obtained based on a user instruction and information from a sensor. The sheet information according to the present exemplary embodiment includes a sheet size, a grammage, a surface property, and a sheet color. These pieces of sheet information are obtained and stored in a hard disk drive (HDD) to be described below. The term “sheet size” refers to finished sheet dimensions defined in International Organization for Standardization (ISO) 216. In the present exemplary embodiment, not only A-series and B-series sizes, but also photo paper sizes can be determined.

The term “grammage” refers to information represented by the weight of paperboard serving as a standard of a sheet, and a mass per 1 $m^2$ is obtained. In the present exemplary embodiment, the grammage is determined based on four levels of 79 $g/m^2$ or less (thin paper), 80 $g/m^2$ or more and 127 $g/m^2$ or less (plain paper), 128 $g/m^2$ or more and 200 $g/m^2$ or less (thick paper), and 201 $g/m^2$ or more (thick paper 2). The term “surface property” refers to information indicating a difference in sheet type due to unevenness of the surface of each sheet. In the present exemplary embodiment, seven types of paper, i.e., fine quality paper, one-side coated paper, both-side coated paper, matte coated paper, embossed paper, film paper, and recycled paper are used.

The term “sheet color” refers to information indicating a degree of whiteness defined in, for example, ISO 2470. In the present exemplary embodiment, a sheet with the degree of whiteness of 70% or more is determined to be a white sheet, and a sheet with the degree of whiteness of less than 70% is determined to be a colored sheet. Table 1 schematically illustrates examples of sheet information.

The sheet size is automatically obtained by the sensor reading the position of a guide (not illustrated) in each feeding deck. The other information is obtained by the user selecting information and inputting the information on a sheet information change screen to be described below. While the present exemplary embodiment illustrates an example where only a part of the sheet information is obtained by the sensor of each feeding deck, the present exemplary embodiment is not limited to the above-described example. For example, sheet information may be determined based on an image scanned by a scanning device to be described below by causing a sheet contained in the feeding deck to pass through the scanning device.

TABLE 1

| Deck ID | Sheet Size | Grammage | Surface Property | Sheet Color |
|---|---|---|---|---|
| 1 | A3 | 80-90 g/m$^2$ | Fine quality paper | White |
| 2 | A4 | 80-90 g/m$^2$ | Fine quality paper | Colored sheet |
| 3 | A4 | 129-150 g/m$^2$ | Embossed Paper | White |
| 4 | A3 | 52-63 g/m$^2$ | Fine quality paper | White |
| 5 | A3 | 129-150 g/m$^2$ | One-side Coated Paper | White |
| 6 | 13 × 19 | 80-90 g/m$^2$ | Fine quality paper | White |

A feeding deck identification (ID) and sheet information are held for each of the six types of feeding decks. Determination criteria for the sheet information are not limited to the above-described examples. A determination criteria may have a resolution that enables a determination as to whether each sheet satisfies matching conditions for an image diagnosis test chart to be described below, and a finer determination criteria may be used for the determination. While an example where each feeding deck is provided with a sensor and information is automatically obtained is described above as a desirable example, sheet information may be registered by the user himself/herself.

Image forming stations 304 to 307 each include a photosensitive drum (photosensitive member), and form toner images on the respective photosensitive drums using toner of different colors. Specifically, the image forming stations 304 to 307 form toner images using yellow (Y) toner, magenta (M) toner, cyan (C) toner, and black (K) toner, respectively.

The toner images of the respectively colors formed in the image forming stations 304 to 307 are sequentially transferred in a superimposed manner on an intermediate transfer belt 308 (primary transfer). The toner images transferred onto the intermediate transfer belt 308 are conveyed to a secondary transfer position 309 along with rotation of the intermediate transfer belt 308. At the secondary transfer position 309, the toner images are transferred onto a recording sheet conveyed through the conveyance path 303 from the intermediate transfer belt 308 (secondary transfer). The recording sheet obtained after the secondary transfer is conveyed to a fixing unit 311. The fixing unit 311 includes a pressure roller and a heating roller. Fixation processing for fixing the toner images onto each recording sheet is performed by applying heat and pressure to the recording sheet while the recording sheet passes between the pressure roller and the heating roller. The recording sheet that has passed through the fixing unit 311 is conveyed to a connection point 315 between the printing unit 107 and the diagnosis unit 108 through a conveyance path 312. In this manner, a color image is formed (printed) on the recording sheet.

In a case where further fixation processing needs to be performed depending on the type of recording sheet, the recording sheet that has passed through the fixing unit 311 is guided to a conveyance path 314 provided with a fixing unit 313. The fixing unit 313 performs further fixation processing on the recording sheet conveyed through the conveyance path 314.

The recording sheet that has passed through the fixing unit 313 is conveyed to a connection point 315. In a case where an operation mode for performing two-sided printing is set, an image is printed on a first surface of the recording sheet, and the recording sheet conveyed through the conveyance path 312 or the conveyance path 314 is guided to a reversing path 316. The recording sheet reversed in the reversing path 316 is guided to a two-sided conveyance path 317 and is conveyed to the secondary transfer position 309. Thus, the toner images are transferred onto a second surface opposite to the first surface of the recording sheet at the secondary transfer position 309. After that, the recording sheet passes through the fixing unit 311 (and the fixing unit 313), so that formation of the color image on the second surface of the recording sheet is completed.

After completion of image formation (printing) in the printing unit 107, the printed recording sheet conveyed to the connection point 315 is further conveyed into the diagnosis unit 108.

The diagnosis unit 108 includes image scanning units 331 and 332 each including a contact image sensor (CIS) on a conveyance path 330 through which the printed recording sheet is conveyed from the printing unit 107. The image scanning units 331 and 332 are located at opposite positions with respect to the conveyance path 330. The image scanning units 331 and 332 are each configured to scan an upper surface (first surface) and a lower surface (second surface), respectively, of the recording sheet. The image scanning units 331 and 332 may include, for example, a charge-coupled device (CCD) or a line scan camera, instead of the CIS.

The diagnosis unit 108 performs image diagnostic processing (image diagnosis) to determine whether there is a defective part in the image forming apparatus 101 based on the image printed on the printed recording sheet conveyed through the conveyance path 330. Specifically, the diagnosis unit 108 performs scanning processing on the image on the printed recording sheet using the image scanning units 331 and 332 at a timing when the printed recording sheet being conveyed reaches a predetermined position.

The diagnosis unit 108 performs the image diagnostic processing based on an image diagnostic processing execution instruction from the user. It may be desirable to execute the image diagnostic processing, for example, before a print operation is started, or when a printing failure occurs consecutively. Recording sheets that have passed through the diagnosis unit 108 are sequentially conveyed onto the stacker 109.

The stacker 109 includes a stack tray 341 as a tray on which printed recording sheets conveyed from the diagnosis unit 108, which is located on an upstream side in a printed recording sheet conveyance direction. The printed recording sheets that have passed through the diagnosis unit 108 are conveyed through a conveyance path 344 in the stacker 109. The printed recording sheets conveyed through the conveyance path 344 is guided to a conveyance path 345, thereby allowing the printed recording sheets to be stacked on the stack tray 341.

The stacker 109 further includes an escape tray 346 as a discharge tray. In the present exemplary embodiment, the escape tray 346 is used to discharge a recording sheet on which a test chart used for image diagnosis by the diagnosis unit 108 is recorded. The printed recording sheet conveyed through the conveyance path 344 is guided to a conveyance path 347, thereby being conveyed to the escape tray 346. The printed recording sheets that have been conveyed without being stacked or discharged in the stacker 109 are further conveyed to the subsequent-stage finisher 110 through a conveyance path 348.

The stacker 109 further includes a reversing unit 349 for reversing the orientation of the printed recording sheet being conveyed. The reversing unit 349 is used to, for example, match an orientation of the recording sheet fed to the stacker 109 with the orientation of the printed recording sheet that is stacked on the stack tray 341 and is output from the stacker 109. The reversing operation by the reversing unit 349 is not performed on the printed recording sheet to be conveyed to the finisher 110 without being stacked in the stacker 109.

The finisher 110 executes a finishing function designated by the user for the printed recording sheet conveyed from the diagnosis unit 108, which is located on the upstream side in the printed recording sheet conveyance direction. In the present exemplary embodiment, the finisher 110 includes finishing functions such as a stapling function (one-point or two-point binding), a punching function (two holes or three holes), and a saddle stich binding function. The finisher 110 includes two discharge trays 351 and 352. If the finishing processing is not performed by the finisher 110, the printed recording sheet conveyed to the finisher 110 is discharged onto the discharge tray 351 through a conveyance path 353. If the finishing processing, such as stapling processing, is performed by the finisher 110, the printed recording sheet conveyed to the finisher 110 is guided to a conveyance path 354. The finisher 110 uses a finishing processing unit 355 to execute the finishing processing designated by the user on the printed recording sheet conveyed through the conveyance path 354. Then, the finisher 110 discharges the printed recording sheet on which the finishing processing is executed onto the discharge tray 352.

<Functional Block Diagram>

Figure 3:
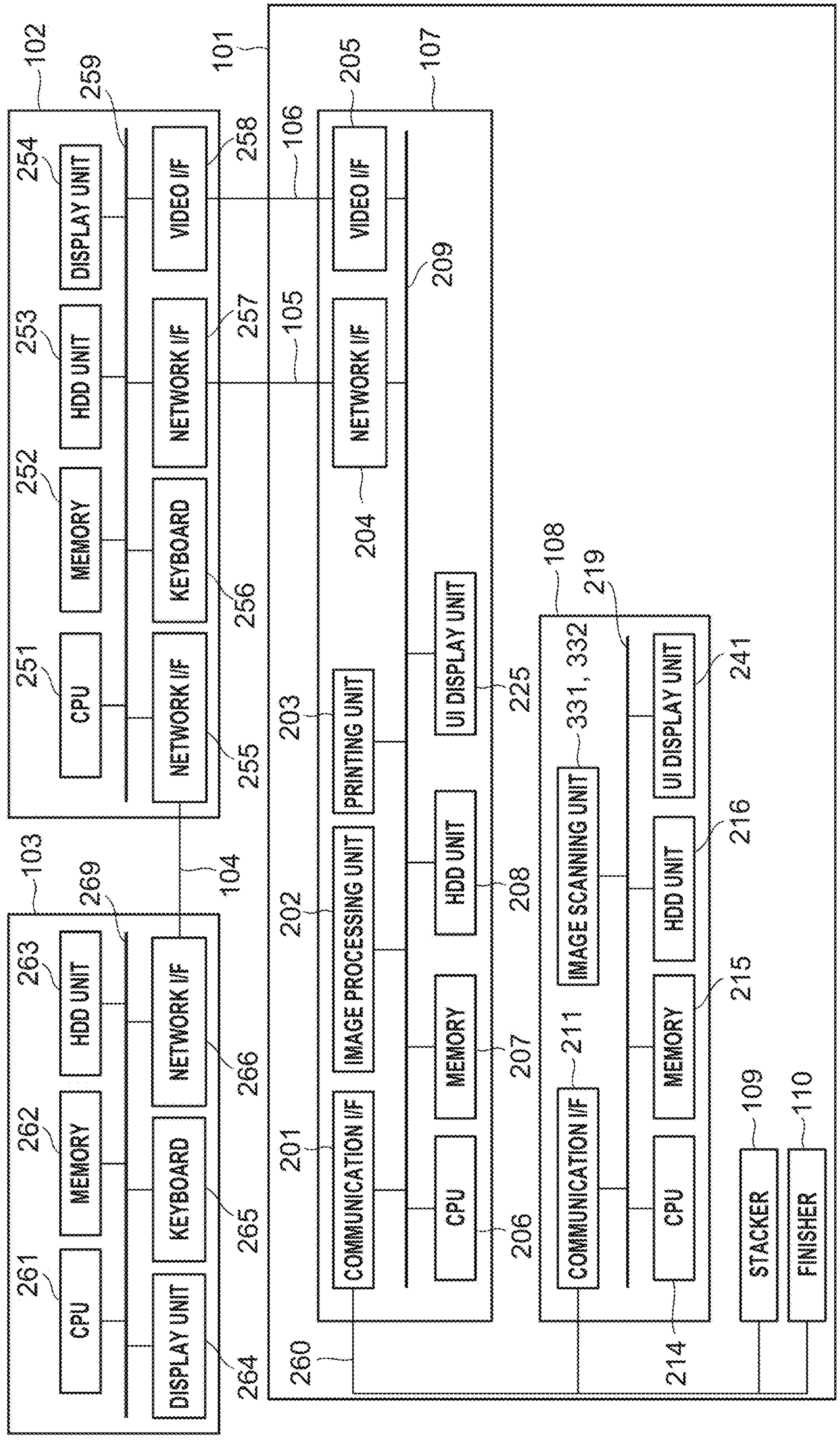
FIG. 3 is a block diagram illustrating an internal configuration of the image forming apparatus, an external controller, and a client personal computer (PC).

FIG. 3 is a schematic functional block diagram illustrating the image forming apparatus 101, the external controller 102, and the client PC 103.

Figure 4:
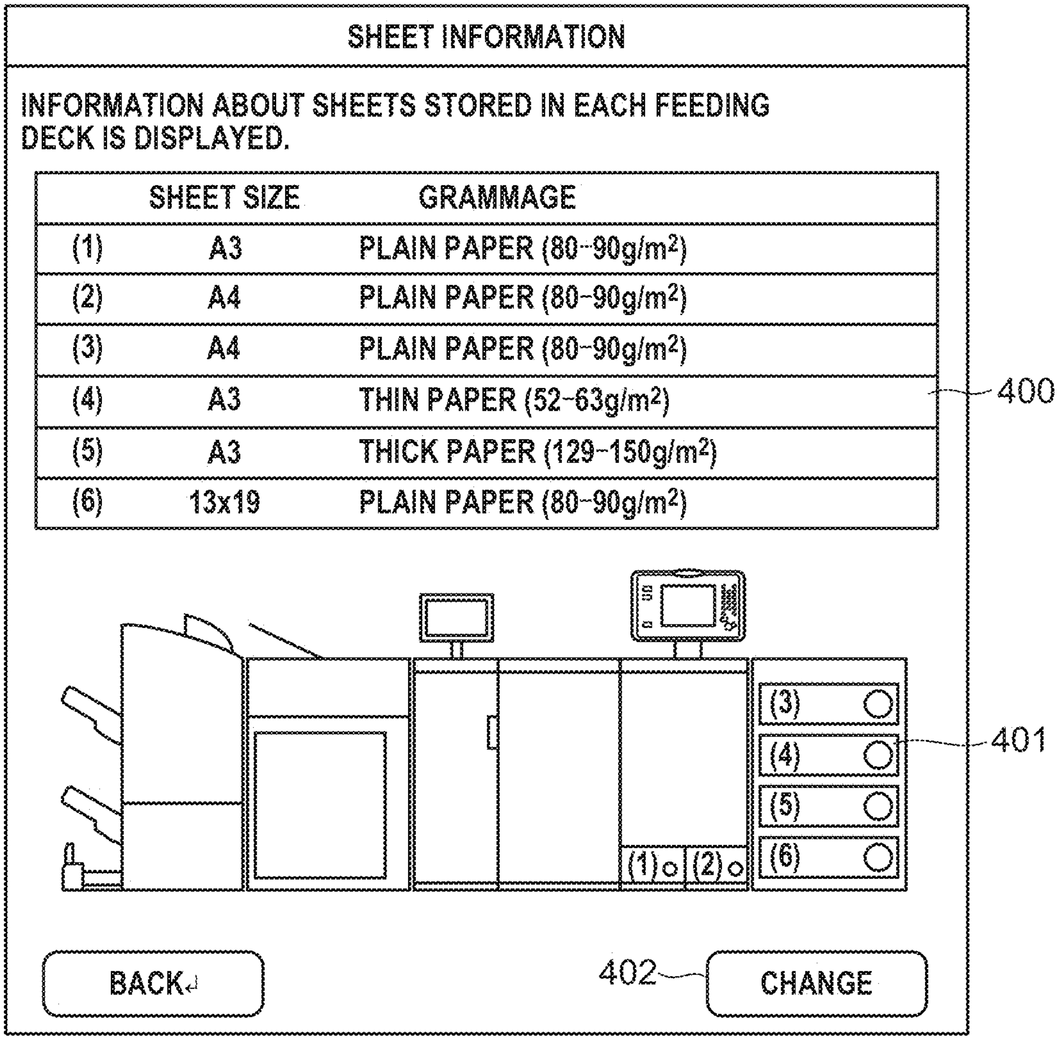
FIG. 4 is a schematic diagram illustrating a confirmation screen for confirming information about sheets contained in respective feeding decks.

The printing unit 107 in the image forming apparatus 101 includes a communication interface (I/F) 201, a network I/F 204, a video I/F 205, a central processing unit (CPU) 206, a memory 207, an HDD unit 208, and a user interface (UI) display unit 225. The printing unit 107 further includes an image processing unit 202 and a printing unit 203. These units are interconnected via a system bus 209 so that data can be mutually transmitted and received. The communication I/F 201 is connected to each of the diagnosis unit 108, the stacker 109, and the finisher 110 via a communication cable 260. The CPU 206 performs communication for controlling each of these devices via the communication I/F 201. The network I/F 204 is connected to the external controller 102 via the internal LAN 105, and is used to communicate control data and the like. The video I/F 205 is connected to the external controller 102 via the video cable 106, and is used to communicate data, such as image data. The printing unit 107 (image forming apparatus 101) and the external controller 102 may be connected only via the video cable 106 as long as operation of the image forming apparatus 101 can be controlled by the external controller 102. The HDD unit 208 stores various programs or data. The CPU 206 executes the programs stored in the HDD unit 208, thereby controlling overall operation of the printing unit 107. The memory 207 stores programs and data for the CPU 206 to perform various types of processing. The memory 207 operates as a work area for the CPU 206. The UI display unit 225 receives an input of various settings and operation instructions from the user, and is used to display various information, such as setting information and a print job processing status. For example, sheet information about sheets stored in each feeding deck is displayed to enable the user to confirm or change the information. FIG. 4 is a schematic diagram illustrating a display screen for the sheet information about each feeding deck. A sheet information list 400 indicates the sheet information for each feeding deck in list form. A typical piece of information in the sheet information is displayed for each feeding deck. FIG. 4 illustrates an example where the sheet size and the grammage are displayed as typical pieces of information when the sheet information illustrated in Table 1 is held. As illustrated in areas 400 and 401, the positions of main bodies of the feeding decks are indicated by numerical values from (1) to (6). A feeding deck for which the sheet information is to be changed is selected on the list. When a change button 402 is pressed, the screen transitions to a change screen, thereby enabling the user to change the information.

The diagnosis unit 108 includes a communication I/F 211, a CPU 214, a memory 215, an HDD unit 216, the image scanning units 331 and 332, and a UI display unit 241. These devices are interconnected via a system bus 219 so that data can be mutually transmitted and received. The communication I/F 211 is connected to the printing unit 107 via the communication cable 260. The CPU 214 performs communication for controlling the diagnosis unit 108 via the communication I/F 211. The CPU 214 executes control programs stored in the memory 215, thereby controlling operation of the diagnosis unit 108. The memory 215 stores the control programs for the diagnosis unit 108. The image scanning units 331 and 332 scan the image on the conveyed recording sheet according to an instruction from the CPU 214. The CPU 214 diagnoses whether there is a defective part in the image forming apparatus 101 based on the scanned image for diagnosis scanned by the image scanning units 331 and 332. Examples of the defective part include the image forming stations 304 to 307 and the fixing unit 311 in the image forming apparatus 101.

The UI display unit 241 is used to display a diagnosis result, a setting screen, and the like. The UI display unit 241 also functions as an operation unit operated by the user. For example, the operation unit receives various instructions, such as a setting change instruction and an image diagnosis execution instruction for the diagnosis unit 108, from the user. The HDD unit 216 stores various types of setting information and image data for image diagnosis. The various types of setting information and image data stored in the HDD unit 216 can be reused.

The stacker 109 controls the printed recording sheet conveyed through the conveyance paths to be discharged onto the stack tray 341, to be discharged onto the escape tray 346, or to be conveyed to the finisher 110 connected on a downstream side in the printed recording sheet conveyance direction.

The finisher 110 controls the conveyance and discharge of the printed recording sheet, and performs finishing processing, such as stapling, punching, or saddle stitch binding.

The external controller 102 includes a CPU 251, a memory 252, an HDD unit 253, a keyboard 256, a display unit 254, network I/Fs 255 and 257, and a video I/F 258. These devices are interconnected via a system bus 259 so that data can be mutually transmitted and received. The CPU 251 executes programs stored in the HDD unit 253, thereby controlling overall operation of the external controller 102, such as reception of print data from the client PC 103, raster image processor (RIP) processing, and transmission of print data to the image forming apparatus 101. The memory 252 stores programs and data for the CPU 251 to perform various types of processing. The memory 252 operates as a work area for the CPU 251.

The HDD unit 253 stores various programs and data. The keyboard 256 is used to input operation instructions for the external controller 102 from the user. The display unit 254 is, for example, a display and is used to display information about an application being executed on the external controller 102 and to display an operation screen. The network I/F 255 is connected to the client PC 103 via the external LAN 104, and is used to communicate data, such as a print instruction. The network I/F 257 is connected to the image forming apparatus 101 via the internal LAN 105, and is used to communicate data, such as a print instruction. The external controller 102 is configured to communicate with each of the printing unit 107, the diagnosis unit 108, the stacker 109, and the finisher 110 via the internal LAN 105 and the communication cable 260. The video I/F 258 is connected to the image forming apparatus 101 via the video cable 106, and is used to communicate data, such as image data (print data).

The client PC 103 includes a CPU 261, a memory 262, an HDD unit 263, a display unit 264, a keyboard 265, and a network I/F 266. These devices are interconnected via a system bus 269 so that data can be mutually transmitted and received. The CPU 261 executes programs stored in the HDD unit 263, thereby controlling operation of each device via the system bus 269. Thus, various types of processing are implemented by the client PC 103. For example, the CPU 261 executes a document processing program stored in the HDD unit 263, thereby generating print data and issuing a print instruction. The memory 262 stores programs and data for the CPU 261 to perform various processing. The memory 262 operates as a work area for the CPU 261.

The HDD unit 263 stores various applications such as a document processing program, programs such as a printer driver, and various types of data. The display unit 264 is, for example, a display and is used to display information about an application being executed on the client PC 103 and to display an operation screen. The keyboard 265 is used to input operation instructions for the client PC 103 from the user. The network I/F 266 is communicably connected to the external controller 102 via the external LAN 104. The CPU 261 communicates with the external controller 102 via the network I/F 266.

<Image Diagnostic Processing>

Figure 5:
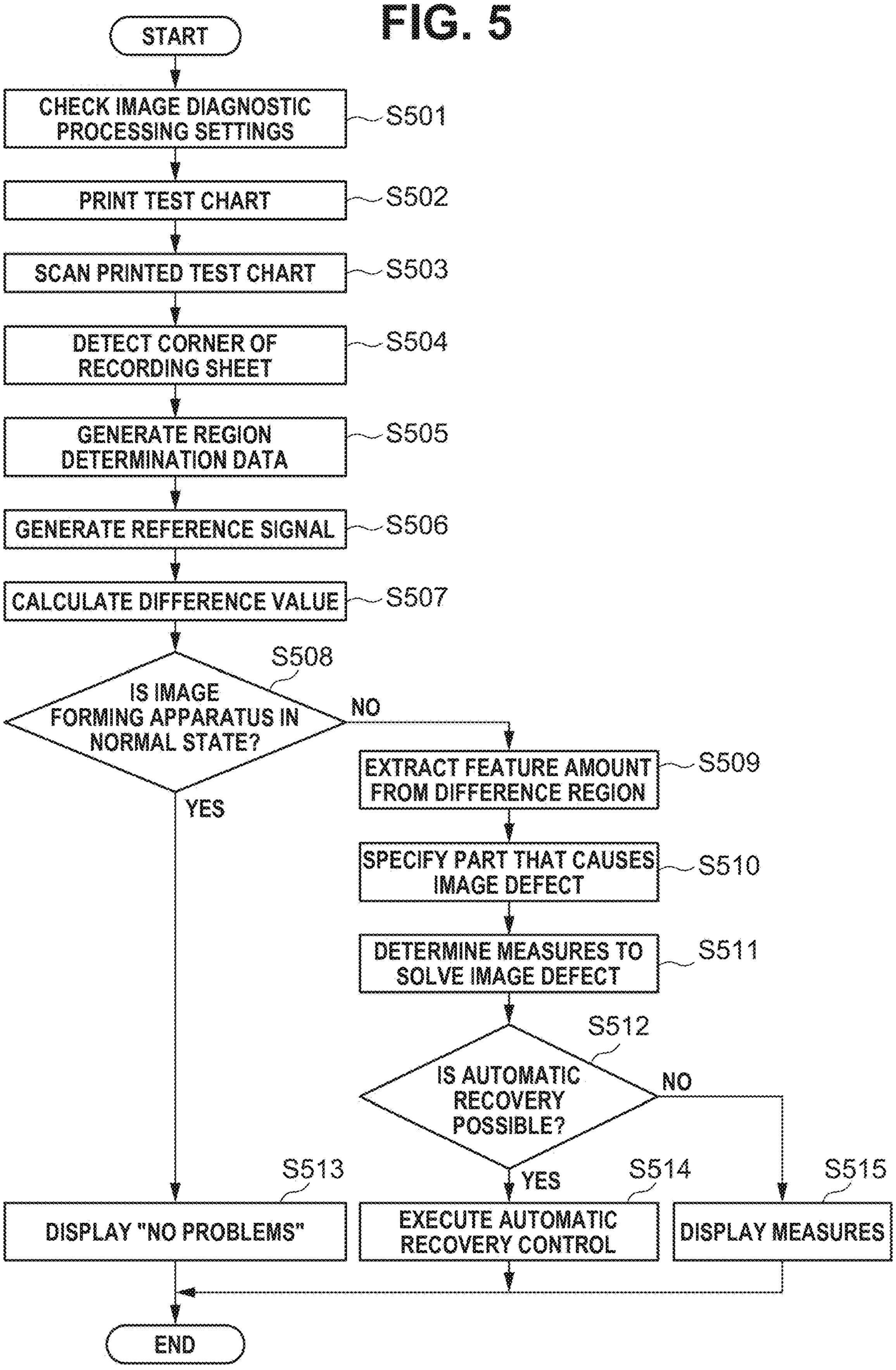
FIG. 5 is a flowchart illustrating a procedure for image diagnostic processing.

Image diagnostic processing according to the present exemplary embodiment will be described with reference to the drawings. FIG. 5 is a flowchart illustrating a procedure for a print operation to be executed by the printing unit 107 and image diagnostic processing to be executed by the diagnosis unit 108. FIG. 5 illustrates an overall processing flow from operation before start of the image diagnostic processing to execution of the image diagnostic processing. Processing of each step illustrated in FIG. 5 is executed by the CPU 206 of the printing unit 107 and the CPU 214 of the diagnosis unit 108.

In step S501, the printing system 100 receives an image diagnosis instruction from the user or a service person via the UI display unit 241, which also functions as the operation unit, and checks image diagnostic processing settings. In the present exemplary embodiment, a timing for starting the image diagnostic processing is, for example, after start-up when the image forming apparatus 101 is powered on. After the start-up, a notification for prompting the user to start diagnostic processing is displayed on at least one of the UI display unit 241, the display unit 254 of the external controller 102, and the UI display unit 225 of the printing unit 107, to thereby prompt the user to issue a diagnosis start instruction. The timing for starting the image diagnostic processing is not limited to that in the above-described example. If the diagnosis unit 108 also has the inspection function for inspecting whether a print defect is present on a printed recording sheet, the user may be prompted to start the image diagnostic processing when print defects are consecutively detected by the inspection function. Also, at a timing other than the start-up of the image forming apparatus 101, time to display a notification for prompting the user to execute the image diagnostic processing may be set using a timer, and the notification may be displayed at the set time.

When the user confirms the notification for prompting the user to start the diagnostic processing, a screen for receiving an image diagnosis start instruction is displayed on the UI display unit 241. Upon receiving the start instruction, the user is prompted to select a feeding deck containing a sheet on which a test chart (chart image) for diagnosis is to be printed as an image diagnosis setting. Details of checking the image diagnostic processing setting will be described below. After completion of checking of the image diagnostic processing setting, the processing proceeds to test chart (chart image) print processing.

Figure 6:
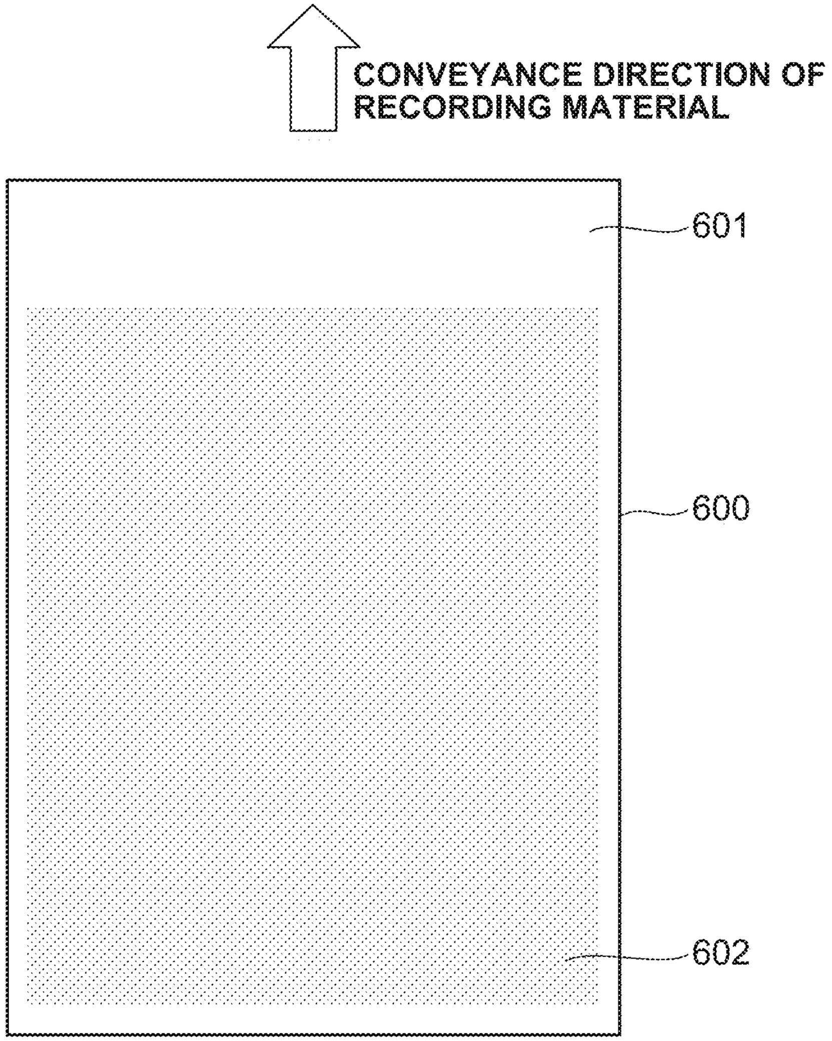
FIG. 6 illustrates an example of a test chart to be used for the image diagnostic processing.

In step S502, the CPU 251 of the external controller 102 reads a preliminarily stored test chart and rasterizes the test chart into a bitmap, thereby creating the rasterized bitmap of the test chart as a reference image. The test chart is an image (hereinafter also referred to as a test image) for diagnosis of a failure in the image forming apparatus 101. FIG. 6 illustrates an example of a test chart to be used for the image diagnostic processing according to the present exemplary embodiment. A test chart 600 includes a non-image portion 601 and an image portion 602. The non-image portion 601 is a region located at a leading edge of the test chart 600 in a conveyance direction, and represents a region on which no image is formed. The image portion 602 is a region located at a position other than the leading edge of the test chart 600 in the conveyance direction, and represents a region where an image is formed with a coloring material. In the image portion 602, for example, a single-color image with an area ratio of 50% is used. Four test charts for cyan, magenta, yellow, and black (CMYK) colors, respectively, are printed. The CPU 251 transmits the rasterized bitmap data on the test chart to the video I/F 205 of the printing unit 107 from the video I/F 258 through the video cable 106. The CPU 206 of the printing unit 107 performs halftone processing on the bitmap data on the test chart received via the video I/F 205, and the printing unit 203 prints the test chart based on the image data subjected to the halftone processing. The configuration of the test chart is a merely example and is not limited to the above-described example. The ratio of the image portion to the non-image portion and the area ratio may vary as long as conditions for making a defect in the printing unit 107 visible using a difference image to be described below can be set, or the image portion may be formed using two or more coloring materials.

In step S503, the CPU 214 of the diagnosis unit 108 executes scan processing on the printed test chart using the image scanning units 331 and 332. The scanned image of the test chart is stored as a diagnosis image in the HDD unit 216 of the diagnosis unit 108. After the diagnosis image is stored, the processing proceeds to step S504.

In step S504, the CPU 214 detects a pixel position corresponding to each sheet corner of the recording sheet from the scanned image. A method for detecting the sheet corner is not particularly limited. For example, a method for extracting a pixel region similar to a preliminarily stored sheet corner image by template matching and calculating the centroid of the pixel region may be used. Any method may be used as long as a sheet corner can be detected, and an intersection between outermost corner edges extracted by Hough transform may be set as a sheet corner. Four pixel positions detected as sheet corners are stored in the HDD unit 216 of the diagnosis unit 108. Then, the processing proceeds to step S505.

In step S505, the CPU 214 determines each pixel position in the scanned image to be either a non-printing region (hereinafter referred to as a non-image portion) where no coloring material is recorded on the inside of a sheet or a printing region (hereinafter referred to as an image portion) where the coloring material is recorded on the inside of the sheet. Then, the CPU 214 creates region determination data corresponding to a determination result. The region determination data contains the same number of pixels as that of the scanned image, and is created as 1-bit data that can represent two states of the non-image portion and the image portion. The determination as to whether a target pixel position corresponds to the non-image portion or the image portion is made based on whether the target pixel position is included in a rectangle of the image portion 602 within the recording sheet. A relative positional relationship between the sheet corners detected in step S504 and the rectangle of the image portion 602 within the recording sheet is preliminarily stored in the HDD unit 216, and pixel positions corresponding to the rectangle of the image portion 602 are calculated based on the sheet corners. As a method for determining whether a target pixel is located on the inside or outside of the rectangle, for example, a known technique, such as crossing number algorithm, is used. Whether the target pixel is located on the inside or outside of a rectangle is determined based on the number of intersections between a straight line drawn from the target pixel position to an edge of the image and straight lines forming the rectangle. If the number of intersections is an even number, it is determined that the target pixel is located on the outside of the rectangle, and "0" indicating the non-image portion is set as data on the target pixel position in the region determination data. In other cases, "1" indicating the image portion within the sheet is set. While the present exemplary embodiment describes the example where the relative positional relationship between the sheet corners and the rectangle of the image portion 602 within the recording sheet is preliminarily stored, the present exemplary embodiment is not limited to the above-described example. For example, a rectangular region where density information (hereinafter referred to as a scanning density) that can be calculated based on a scanning signal value on the inside of the recording sheet with the scanned image varies at a certain rate or more may be calculated, and the rectangular region may be determined to be an image region. The region determination data described above is created and stored in the HDD unit 216 of the diagnosis unit 108. After the region determination data is stored, the processing proceeds to step S506.

In step S506, the CPU 214 calculates average values serving as reference signals to generate difference image data to determine a failure in the printing unit 107. An average value Ave_w in the non-image portion 601 and an average value Ave_image in the image portion 602 are calculated. The average values are calculated using the region determination data created in step S505 and the scanned image. The average value Ave_w is calculated by averaging signal values of the scanned image corresponding to the pixel positions determined to be located within the non-image portion 601 based on the region determination data. Similarly, the average value Ave_image is calculated by averaging signal values of the scanned image corresponding to the pixel positions determined to be located within the image portion 602. The average values Ave_w and Ave_image serving as the reference signals are calculated such that red (R), green (G), and blue (B) signal values of the scanned image are converted into luminance values, and an average of the luminance values is calculated. The RGB signal values are converted into a luminance value Y by the following formula (1) defined in International Telecommunication Union Telecommunication Standardization Sector (ITU-T) BT.709.

$$Y=0.2126\times R+0.7152\times G+0.0722\times B \quad (1)$$

The calculated average values are stored in the HDD unit 216, and then the processing proceeds to step S507. In step S507, difference image data for determining a failure in the printing unit 107 is created.

In step S507, the CPU 214 creates difference image data between the scanned image and the average values of the respective regions calculated in step S506. The CPU 214 uses the region determination data and the scanned image to determine that a target pixel is located on the inside of the recording sheet when the region determination data corresponding to a target pixel position in the scanned image indicates 1 (non-image portion) or 2 (image portion). Then, the CPU 214 compares the corresponding average value with the scanned image, and calculates a difference value. When the calculated difference value is larger than or equal to a preliminarily set threshold, it is determined that there is a difference, and 1 is set to the difference image data. On the other hand, if the calculated difference value is smaller than the threshold, 0 is set to the difference image data. A method for calculating the difference image data is not limited to that in the above-described example. While the present exemplary embodiment describes the example where the average values are calculated based on the scanned image and the calculated average values are used as the reference signals, values expected as the reference signals may be preliminarily stored in the HDD unit 216. Further, a correction unit that corrects non-linearity between the luminance and signal values of the scanned image obtained by the image scanning unit 331 may be provided to calculate difference image data after correcting the signal values of the scanned image. The difference image data, which is binary data indicating whether there is a difference, is stored in the HDD unit 216. Then, the processing proceeds to step S508.

After completion of creation of the difference image data, in step S508, the CPU 214 determines whether the image forming apparatus 101 is in a normal state. The determination is made based on whether the difference image data includes data indicating 1. If the CPU 214 obtains a determination result indicating that the image forming apparatus 101 is in the normal state (YES in step S508), the processing proceeds to step S513. In step S513, the CPU 214 displays "no problems" as a diagnosis result indicating that the diagnosis result is normal on the UI display unit 241 of the diagnosis unit 108. On the other hand, if the CPU 214 obtains a determination result indicating that the image forming apparatus 101 is not in the normal state (difference image data includes 1) (NO in step S508), the processing proceeds to step S509. In steps S509 to S512, a defective part in the image forming apparatus 101 is identified based on the scanned image data and the difference image data, and an instruction for measurements is issued.

In step S509, the CPU 214 extracts a feature amount for identifying a defective part in the printing unit 107 from the scanned image data and the difference image data. A difference feature amount is extracted from the scanned image corresponding to a difference region determined to be "different" calculated based on the difference image data in step S507. Examples of feature information about the difference region obtained in such extraction processing include coloring material information indicating which one of yellow, magenta, cyan, and black causes a defect, contrast information indicating a density of a defect, and shape information indicating a size, an orientation such as portrait, and the like. Examples of the feature information also include coordinate information indicating a position in a direction perpendicular to the conveyance direction of the test chart in the printing unit 107, and cycle information indicating that defects with similar features occur cyclically in the conveyance direction of the test chart in the printing unit 107.

In step S510, the CPU 214 identifies a part causing an image defect from the printing unit 107 and the image scanning unit 331 based on the feature information about the difference region obtained in step S509. In the difference region, a combination of regions having the same color and with high similarity is selected, and the defective part is identified based on the cycle information about the selected combination.

In step S511, the CPU 214 determines measures to be taken for the image defect based on the part causing the image defect identified in step S510. The measures to be taken include measures with which automatic recovery is possible and measures with which the automatic recovery is not possible. Examples of the measures with which the automatic recovery is possible include measures with which the automatic recovery is possible in the printing unit 107, such as cleaning of a wire or grid of a corona charger serving as a charging unit of each photosensitive drum included in the image forming stations 304 to 307 of the printing unit 107. The measures with which the automatic recovery is not possible include the following two examples. The first example of such measures includes measures that require a user operation, such as cleaning of stain on a scanning glass surface of each of the image scanning units 331 and 332 of the diagnosis unit 108 and an adjustment of a recording sheet to be used, and measures that require an operation to be performed by a service person, such as replacement of parts. The second example of such measures include measures that deal with a scanning failure in each image scanning unit, and measures against fiber, foreign material, or the like contained in each recording sheet before image formation.

Next, in step S512, the CPU 214 determines whether the measures determined in step S511 are measures with which the automatic recovery is possible. If the CPU 214 obtains a determination result indicating that the determined measures are measures with which the automatic recovery is possible (YES in step S512), the processing proceeds to step S514.

In step S514, the CPU 214 executes an automatic recovery control to deal with a cause of the image defect.

On the other hand, if the CPU 214 obtains a determination result indicating that the determined measures are not the measures with which the automatic recovery is possible (NO in step S512), the processing proceeds to step S515. In step S515, the CPU 214 displays an image diagnosis result and the measures to be taken on the UI display unit 241 of the diagnosis unit 108. After completion of processing of any one of steps S513, S514, and S515 described above, the processing flow (image diagnostic processing) illustrated in FIG. 5 ends.

<Procedure for Diagnosis Setting Processing Step S501>

Figure 7:
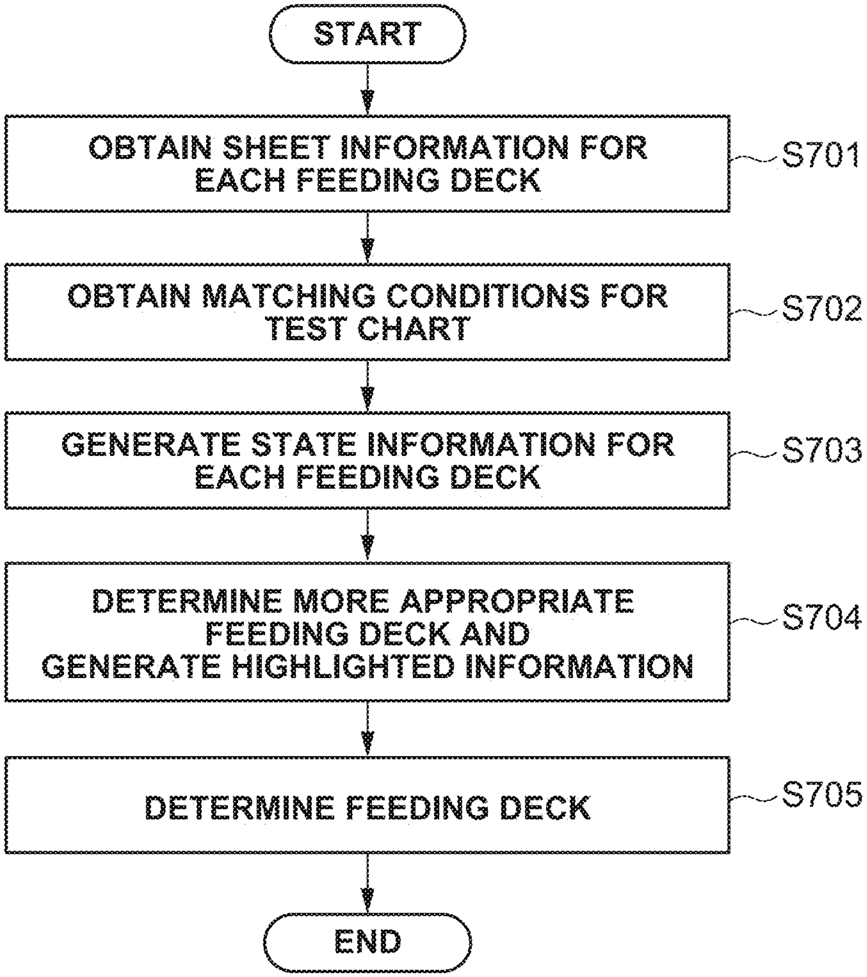
FIG. 7 is a flowchart illustrating a processing procedure for confirming diagnosis settings in the image diagnostic processing.
Figure 8:
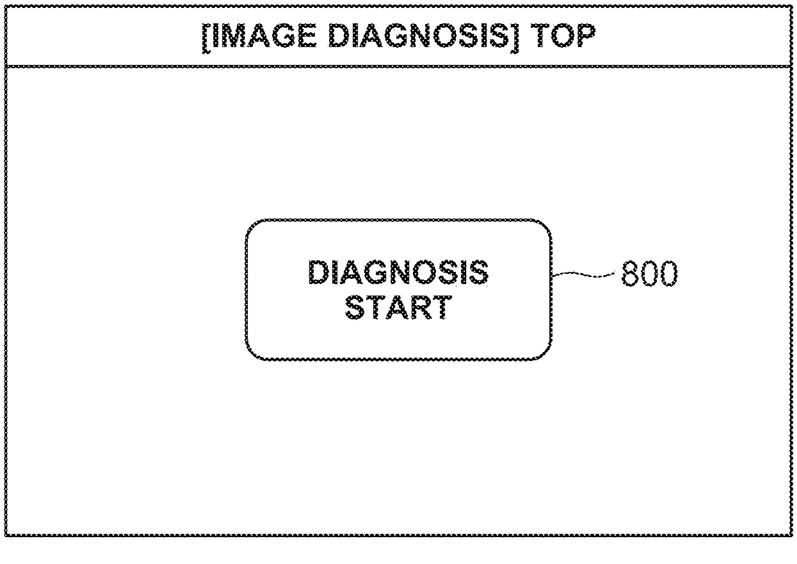
FIG. 8 is a schematic diagram illustrating a screen for receiving an image diagnostic processing start instruction.

FIG. 7 is a flowchart illustrating a detailed procedure for image diagnosis setting processing in step S501 illustrated in FIG. 5. FIG. 7 illustrates a processing flow from when the user confirms the notification for prompting the user to start diagnosis and issues an image diagnostic processing start instruction to when setting of the image diagnosis is completed. The image diagnostic processing start instruction is received when, for example, a screen illustrated in FIG. 8 is displayed on the UI display unit 241 and an image diagnosis start button 800 is pressed. After the image diagnostic processing start instruction is received, the position corresponding to the feeding deck containing a sheet for printing the test chart is selected from among the feeding decks included in the image forming apparatus 101, and the selected position is set as a diagnosis setting.

Processing in each step illustrated in FIG. 7 is executed by the CPU 214 of the diagnosis unit 108.

First, in step S701, the CPU 214 obtains sheet information for each feeding deck held in the HDD unit 208.

Next, in step S702, the CPU 214 obtains matching conditions for a sheet appropriate for the test chart from the HDD unit 216. The matching conditions will be described in detail below.

<Matching Conditions for Test Chart>

As described above in steps S508 to S515, in the image diagnostic processing according to the present exemplary embodiment, a defective portion having a difference from the reference image is detected on the printed sheet to thereby perform diagnostic processing. In other words, if the defective portion is not made visible on the sheet, the diagnostic processing cannot be accurately performed. Therefore, the following conditions may be set for a sheet appropriate for the test chart.

The sheet size will be described. As a first condition, a main scanning width of the sheet is to be a maximum size printable by the printing unit 107. The sheet is to have a wider main scanning width among printable sizes so that a defect that may occur at an edge of a component constituting the printing unit 107 can be made visible. A second condition relates to a sub-scanning width of the sheet. If a failure is found in a cylindrical member, such as the photosensitive drum and the pressure roller or the heating roller of the fixing unit 311, defects appear in a cycle depending on an outer diameter of the cylindrical member. It is necessary to detect at least two cycles with three defects to distinguish between a noise and a defect due to the failure. If the sub-scanning width is short, the two cycles do not fit into one page, which may make it difficult to accurately make a determination. In the present exemplary embodiment, a sub-scanning width of 42.0 cm or more, with which a determination can be performed for 90% or more of the components (that is sufficiently accurate as a means for identifying a defective component), is set as a matching condition for the sub-scanning width. It may be more desirable to use a sheet with a longer length in a sub-scanning direction so that more cycles can be made visible.

To prevent the unevenness of the surface of a sheet or a gloss difference from being detected as a defect, it is desirable not to use a sheet with the unevenness, such as embossed paper, or a sheet with no white portion, such as film paper. Accordingly, use of a sheet other than "embossed paper" or "film paper" is set as a matching condition for the surface property. Further, the color of the sheet is to be white since white has a great difference in color from all the coloring materials, so that the difference from the reference signal can be accurately obtained. Therefore, use of a sheet with color close to white is set as a matching condition for the sheet color.

As described above, the following matching conditions are set in the present exemplary embodiment to prevent deterioration in diagnosis accuracy as a chart for diagnosis for the image diagnosis. The matching conditions are: the sheet has a main scanning width of 11 inches or more and a sub-scanning width of 42.0 cm or more that are set in consideration of the use frequency of each sheet size by the user, the sheet includes a white portion and has the unevenness at a certain level or less as the surface property, such as embossed paper or film paper, and the sheet has the color close to white. After the above-described matching conditions are obtained, the processing proceeds to step S703. In step S703, it is determined whether a test chart can be printed for each feeding deck.

Figure 9:
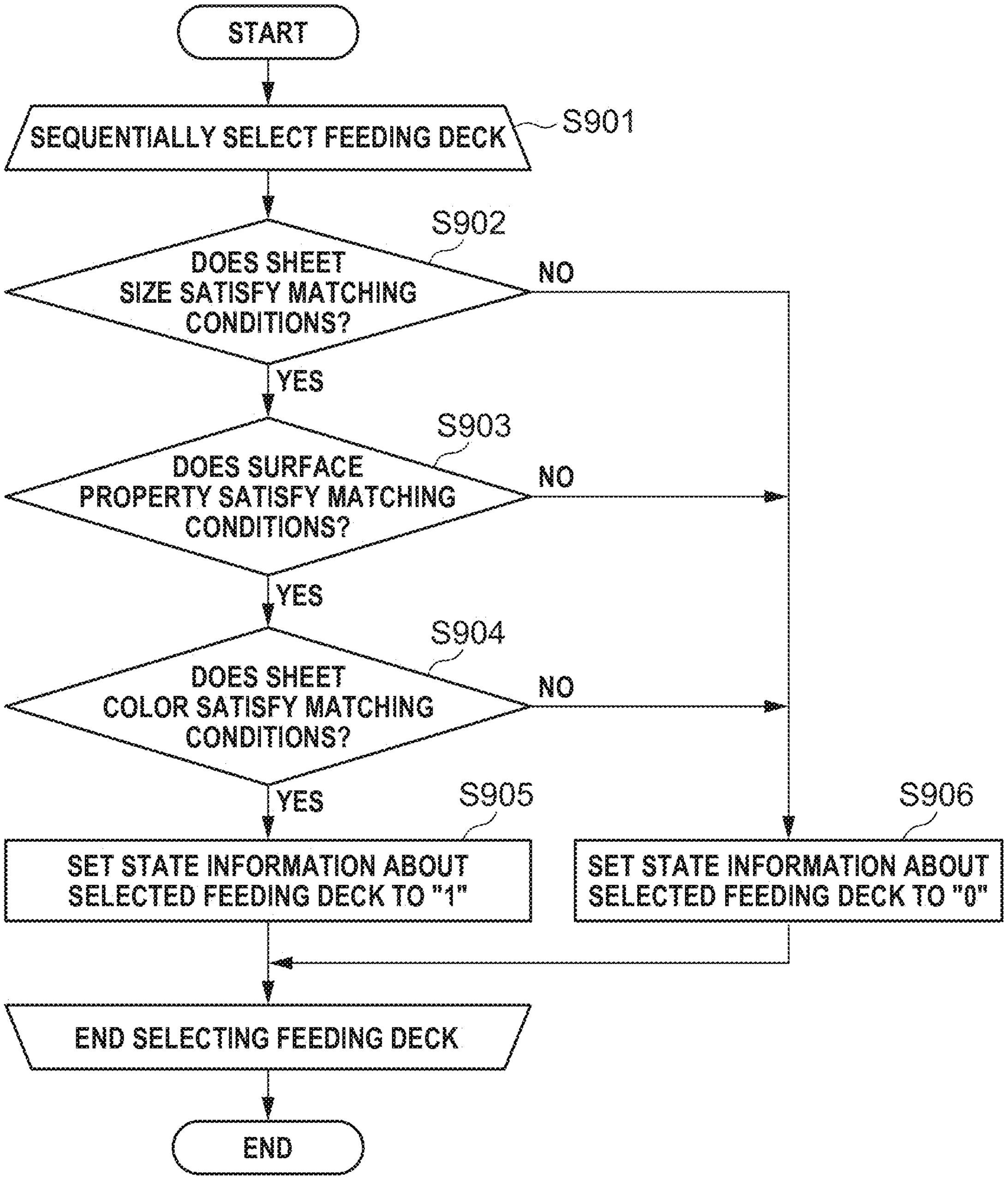
FIG. 9 is a flowchart illustrating a processing flow for determining whether a sheet contained in a feeding deck satisfies matching conditions.

Next, in step S703, the CPU 214 compares the sheet information obtained in step S701 with the matching conditions obtained in step S702, determines whether each feeding deck contains a sheet that satisfies the matching conditions, and generates state information for a list of feeding decks. The state information is 1-bit data indicating "1" when the feeding deck satisfies the matching conditions and indicating "0" when the feeding deck does not satisfy the matching conditions. Pieces of state information as many as the number of feeding decks are generated. In the present exemplary embodiment, six pieces of state information for six types of feeding decks are generated. FIG. 9 illustrates a detailed processing flow of step S703. In step S901, it is determined whether there is a feeding deck for which the state information is not generated. If there is a feeding deck for which the state information is not generated, processing of step S902 and subsequent steps are carried out. If there is the feeding deck for which the state information is not generated, it is sequentially checked whether the feeding deck contains a sheet that satisfies the matching conditions in steps S902 to S904. If the matching conditions are satisfied (YES in step S904), the processing proceeds to step S905. In step S905, "1" is set as state information about the checked feeding deck. If any one of stored sheet conditions does not satisfy the matching conditions, "0" is set as the state information in step S906. After completion of generation of the state information for all the feeding decks, the processing proceeds to step S704.

Next, in step S704, the CPU 214 determines a more appropriate feeding deck among the feeding decks containing appropriate sheets, and generates highlighted information about the more appropriate feeding deck. The more appropriate feeding deck refers to a feeding deck containing a sheet with the sheet conditions that enable higher diagnosis accuracy among the sheets that satisfy the matching conditions. As described above with regard to the matching conditions for the test chart, the use of a sheet with a larger size and with a larger printing area can make a defect more visible. In other words, it can be determined that a feeding deck containing a sheet with a wider main scanning width, a longer sub-scanning width, and a larger sheet size is an appropriate feeding deck. Accordingly, a sheet area is calculated for each feeding deck with the state information "1", and highlighted information corresponding to the feeding deck containing a sheet with a larger sheet area is set to "1". After completion of generation of the highlighted information, the processing proceeds to step S705. While the present exemplary embodiment illustrates the example where the more appropriate feeding deck is selected based only on the sheet size, it may be more desirable to determine a sheet with a higher degree of whiteness or higher surface uniformity based on the sheet color and the surface property so that a defect due to the coloring material can be made more visible.

Figure 10:
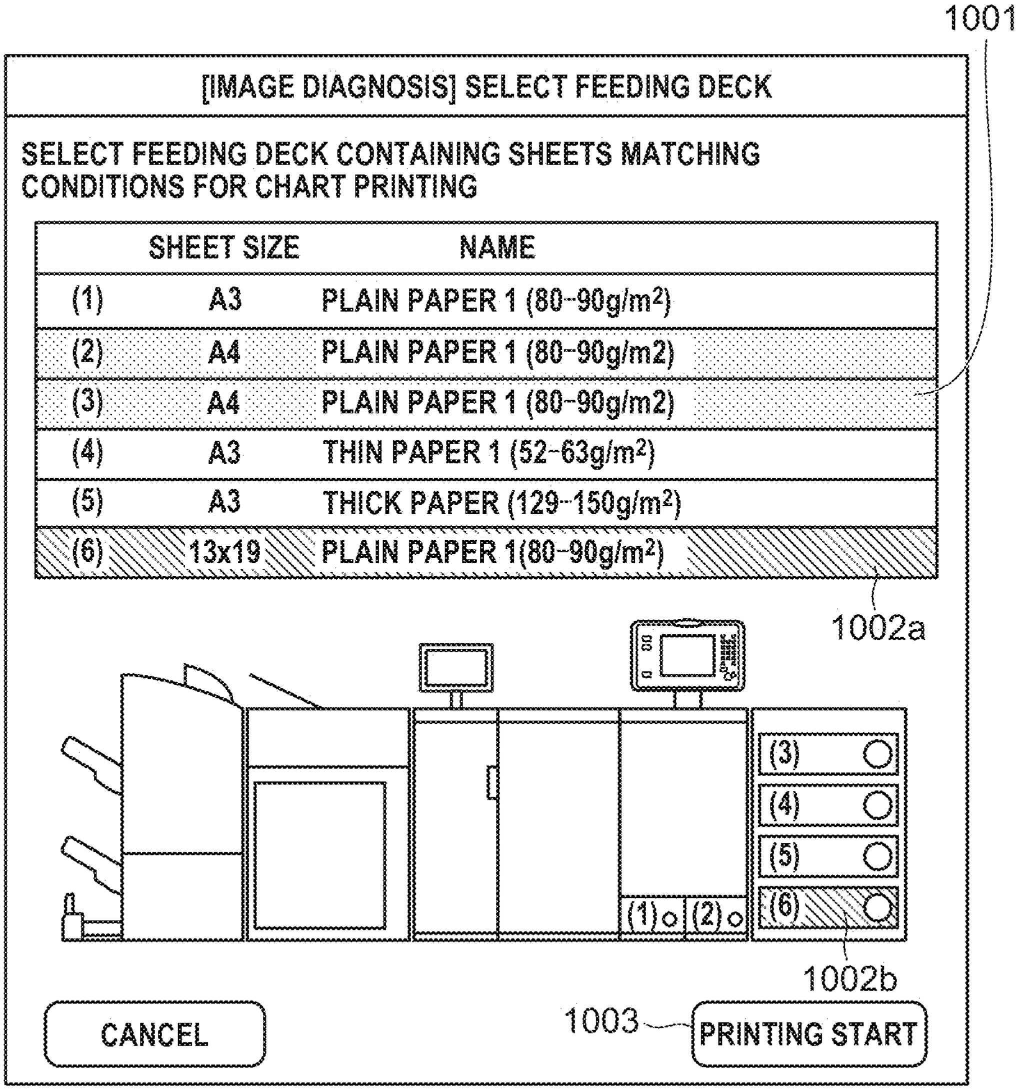
FIG. 10 is a schematic diagram illustrating a screen for displaying feeding decks containing sheets appropriate for image diagnostic processing and a more appropriate feeding deck among feeding decks.

Lastly, in step S705, the CPU 214 generates a screen including the list of feeding decks based on the state information and the highlighted information, and controls the UI display unit 241 to display the screen (display control). FIG. 10 is a schematic diagram illustrating an example of the screen including the list of feeding decks. The feeding decks with the state information indicating "0" generated in step S703 are grayed out as indicated by a feeding deck 1001 and are set not to be selected by the user. Further, a more appropriate feeding deck is highlighted as indicated by a feeding deck 1002*a* (1002*b*) among feeding decks that satisfy the matching conditions based on the highlighted information generated in step S704 to thereby prompt the user to select the more appropriate feeding deck.

When selection of the feeding deck by the user from the list of feeding decks illustrated in FIG. 10 is received, the selected feeding deck is displayed in a selected state. At a timing when a printing start button 1003 is pressed, the feeding deck in the selected state is set as the feeding deck from which a sheet for the test chart is supplied, and printing of the test chart is started.

As described above, the example has been described where sheet conditions appropriate for a chart for diagnosis are preliminarily set, whether a sheet contained in each feeding deck satisfies the conditions is determined, and the user is notified of an appropriate feeding deck. The notification makes it possible to reduce the number of steps for the user to take in selecting a feeding deck.

Figure 11:
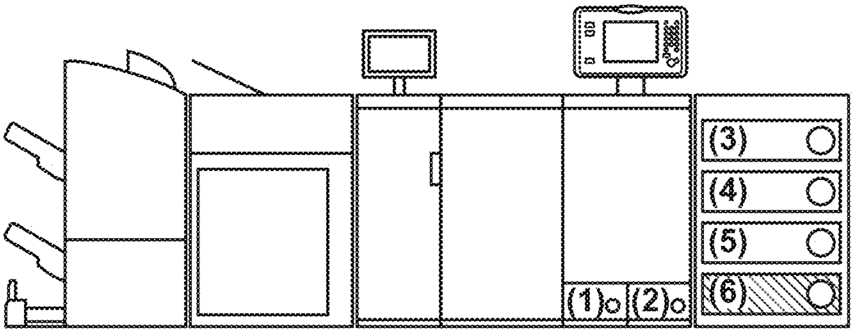
FIG. 11 is a schematic diagram illustrating a screen for confirming an automatically selected feeding deck.

While, in the present exemplary embodiment, the example where the user is caused to confirm a feeding deck containing the sheet that satisfies the matching conditions and to select the feeding deck has been described, the present disclosure is not limited to the above-described example. For example, a more appropriate feeding deck may be selected from among the feeding decks that satisfy matching conditions without displaying the selection screen illustrated in FIG. 10, and printing may be automatically started. Alternatively, a feeding deck may be automatically selected, and then, as illustrated in a schematic diagram of FIG. 11, the user may be caused to confirm whether to start printing using the selected feeding deck.

While the present exemplary embodiment is described on an assumption that the plurality of feeding decks is used, the number of feeding decks is not limited to the above-described example. Even if only one feeding deck is used and it is determined whether a sheet contained in the feeding deck satisfies the matching conditions, a notification indicating that the sheet contained in the feeding deck does not satisfy the conditions can be issued to the user, thereby making it possible to reduce the number of steps for the user to take in selecting a feeding deck.

Figure 12:
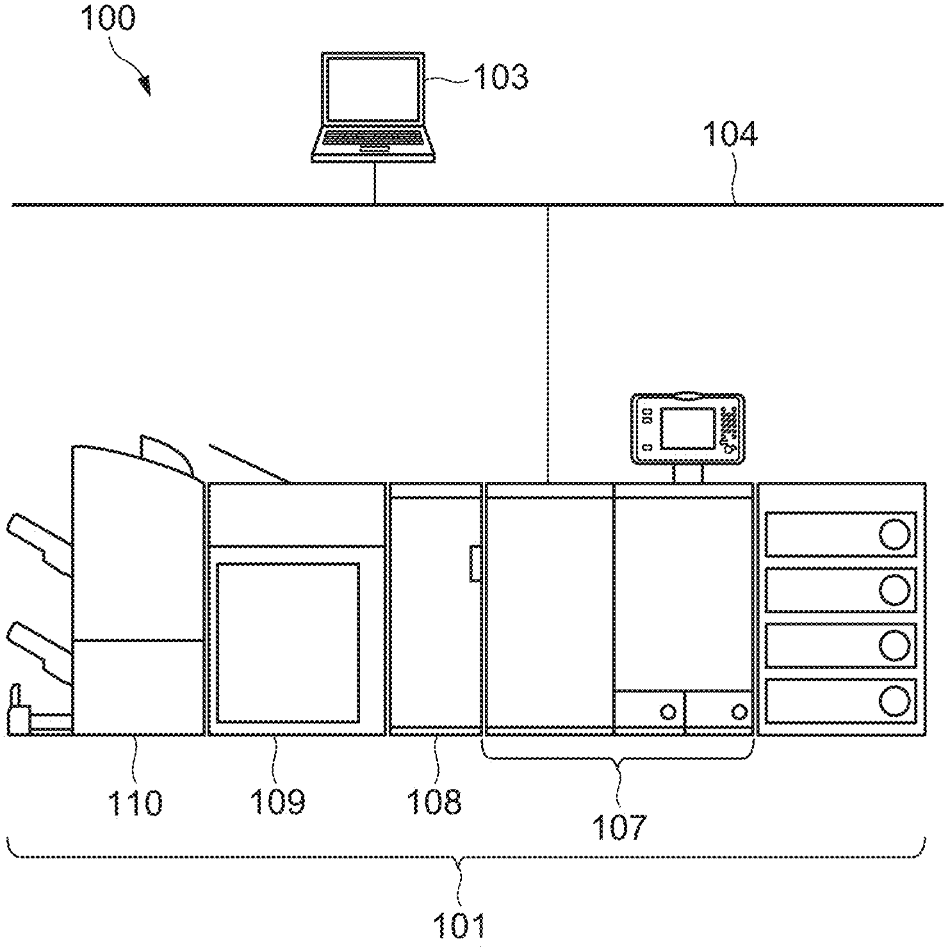
FIG. 12 illustrates a network configuration example that includes the printing system and does not include the external controller.

While the present exemplary embodiment describes a configuration example in which various instructions, such as an execution instruction for the diagnosis unit 108, are received from the user on the UI display unit 241, effects of the present disclosure are not limited to the above-described example. In the configuration example illustrated in FIG. 1, the external controller 102 is connected to the image forming apparatus 101, and each of the diagnosis unit 108, the printing unit 107, and the external controller 102 includes a UI unit. However, the present exemplary embodiment is also applicable to a configuration different from this configuration example. For example, as illustrated in a system configuration diagram of FIG. 12, a configuration in which the image forming apparatus 101 is connected to the external LAN 104 and print data is transmitted from the client PC 103 to the image forming apparatus 101 without using the external controller 102 may be used. Only the UI display unit 225 for the printing unit 107 may be used as the UI unit. In this case, the execution instruction or the like for the diagnosis unit 108 may be issued on the UI display unit 225.

In the present exemplary embodiment, the sheet size, the grammage, the surface property, and the sheet color are obtained as the sheet information, and the feeding deck containing a sheet with a larger size among the feeding decks that satisfy the matching conditions is determined to be the appropriate feeding deck. However, the sheet information and the determination of the appropriate feeding deck are not limited to the above-described examples. For example, a cost of each sheet may be held as the sheet information. An example where the cost is estimated based on the grammage, or is designated by the user may be considered. To perform the image diagnosis at lower cost, a feeding deck containing a most inexpensive sheet may be determined to be the appropriate feeding deck among the feeding decks that satisfy the matching conditions. While the present exemplary embodiment describes an example where a one-sided test chart is used, if the diagnosis is to be performed with a smaller number of sheets, it is desirable to perform the image diagnostic processing by performing two-sided printing. In the case of performing the two-sided printing, it is more desirable for the sheet information to include information indicating whether the surface property of the front surface of a sheet is the same as the surface property of the back surface of the sheet. For example, if it is necessary that the surface property of the front surface of a sheet be the same as the surface property of the back surface of the sheet, one-side coated paper does not satisfy the conditions.

While the present exemplary embodiment describes the example where the user confirms a screen illustrated in FIG. 8 and determines whether each feeding deck contains a sheet that satisfies the matching conditions after reception of the diagnosis start instruction, the present exemplary embodiment is not limited to the above-described example. It may be more desirable to determine whether there is a feeding deck containing a sheet that satisfies the matching conditions at a time when a notification for prompting the user to perform the image diagnosis is displayed. If there is no feeding deck that satisfies the matching conditions, it is desirable to prompt the user to add another sheet. Also, when the remaining number of sheets is obtained for each feeding deck and there are no remaining sheets to be used for the test chart, it is desirable to prompt the user to add another sheet. At the time when the notification for prompting the user to perform the image diagnosis is displayed, a notification indicating that there is a need to add another sheet may be issued in advance, thereby making it possible to reduce unnecessary movements by the user moving between the UI display unit 241 and the feeding decks when the user perform the image diagnosis.

Image diagnostic processing according to a second exemplary embodiment will be described. The first exemplary embodiment describes the example where, in the case of performing the image diagnostic processing, a feeding deck is selected by comparing the sheet conditions of a sheet stored in each feeding deck with the sheet conditions of a sheet appropriate for the chart for diagnosis that are preliminarily stored. However, the effects of the present exemplary embodiment are not limited to the above-described example. For example, in a case where a coloring material to be diagnosed can be designated and a component item to be diagnosed can be designated in the settings of the image diagnosis, matching conditions can be corrected depending on the coloring material to be diagnosed or the component item to be diagnosed. The matching conditions are corrected to be eased depending on conditions to be diagnosed, thereby it is possible to prevent unnecessary sheet cost.

Figure 13:
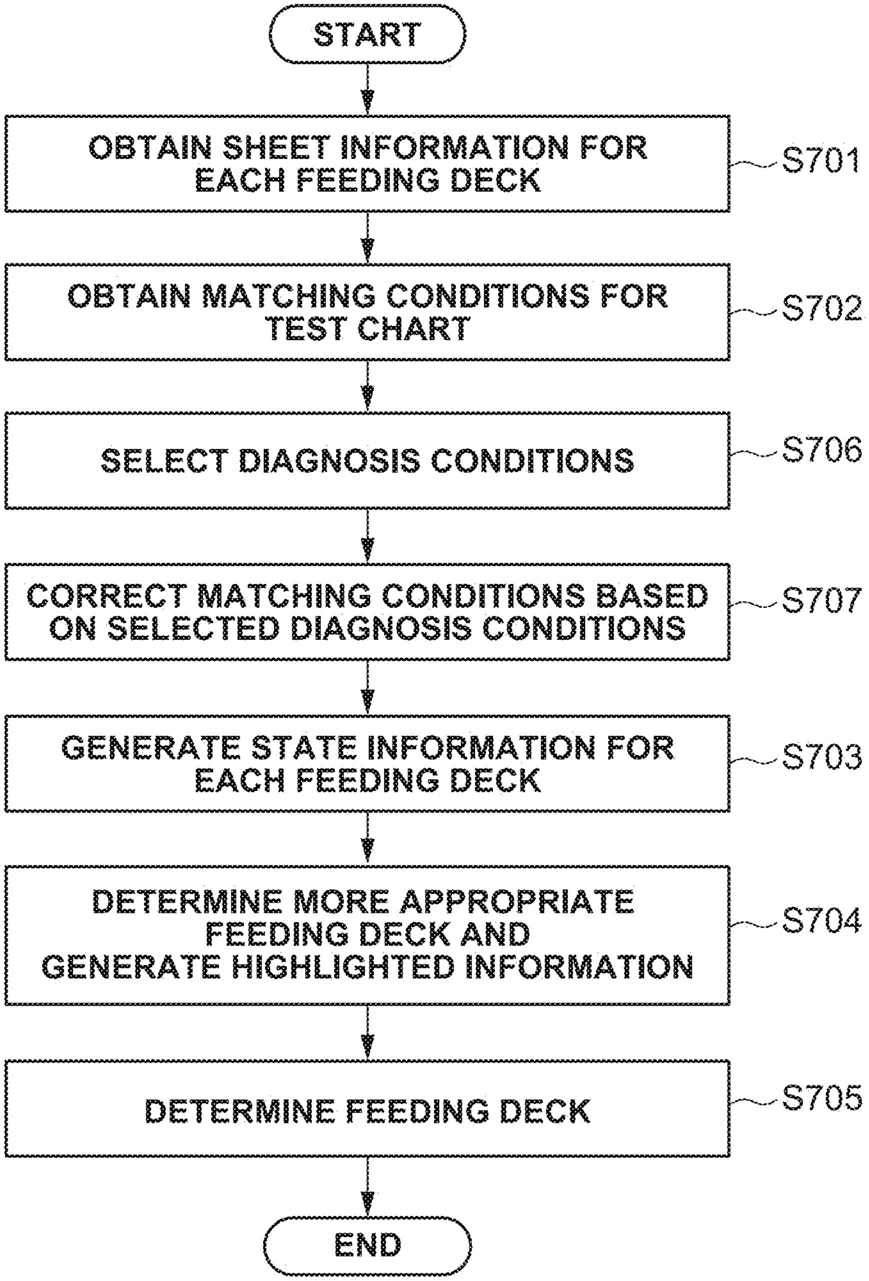
FIG. 13 is a flowchart illustrating a feeding deck determination processing flow according to a second exemplary embodiment.

FIG. 13 illustrates a detailed procedure for image diagnosis setting processing in step S501 according to the second exemplary embodiment. A configuration of the printing system 100 and an image diagnostic processing flow according to the present exemplary embodiment are similar to those of the first exemplary embodiment, and thus descriptions thereof are omitted. Processing in image diagnostic processing steps S706 and S707, which are different from the steps according to the first exemplary embodiment, will be described. Processing in each step illustrated in FIG. 13 is executed by the CPU 214 of the diagnosis unit 108, as in the first exemplary embodiment.

Figure 14:
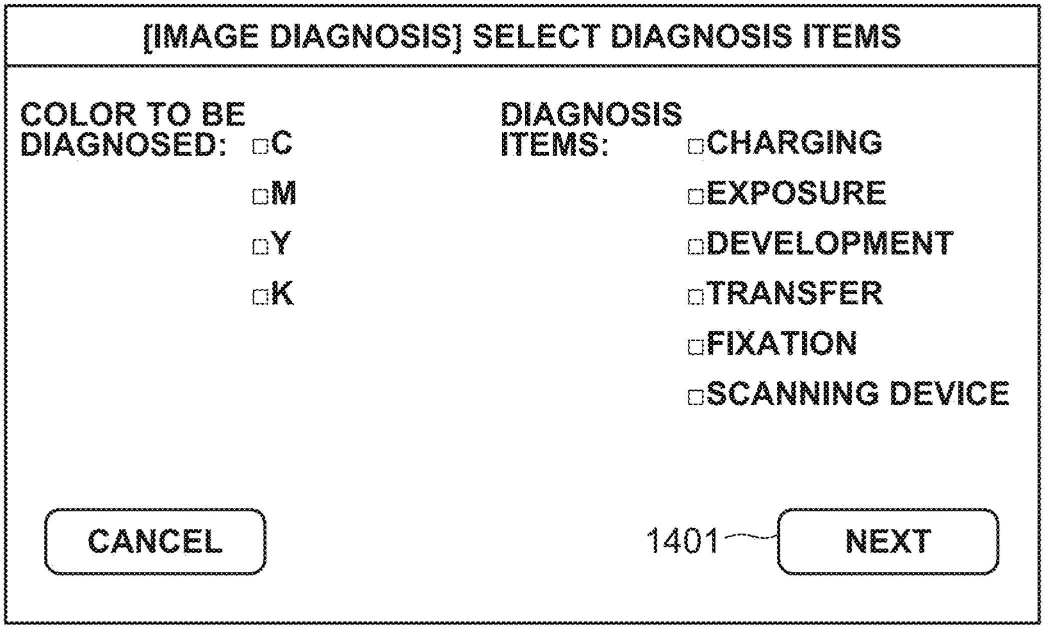
FIG. 14 is a schematic diagram illustrating a setting screen on which an item for color to be diagnosed and diagnosis items can be selected as image diagnostic processing settings.

First, in step S706, the CPU 214 receives diagnosis conditions selected by the user, and holds the received diagnosis conditions in the HDD unit 208. FIG. 14 is a schematic diagram of a screen for receiving the diagnosis conditions from the user. The user is prompted to select a coloring material to be diagnosed (color to be diagnosed) as a diagnosis item and a component item to be diagnosed (diagnosis item). As illustrated in FIG. 14, a checkbox for each condition is prepared. When the user presses a next button 1401, the checked conditions are held as the diagnosis conditions in the HDD unit 208. After the diagnosis conditions are held, the processing proceeds to step S707 to correct matching conditions based on the diagnosis conditions.

In step S707, the CPU 214 corrects the matching conditions obtained in step S702 to be eased based on the diagnosis items held in the HDD unit 208. In correction processing, the matching conditions are corrected with correction values preliminarily set for matching conditions for a test chart based on the color to be diagnosed and the diagnosis items. Table 2 illustrates examples of the correction values based on the color to be diagnosed and the diagnosis items. Table 2 includes correction values for matching conditions for a sub-scanning width based on the color to be diagnosed and the diagnosis items. For example, the sub-scanning width necessary for making a defect visible varies depending on the outer periphery of a developing drum to be diagnosed when charging is selected.

If a diagnosis is to be performed on the developing drum with a longer outer periphery than that for CMY colors, a width of 42.0 cm or more is required. However, CMY colors each with a shorter outer periphery indicate that the diagnosis can be performed with a width of 28.8 cm or more. Further, a scanning device that includes no cylindrical member and for which it is not necessary to determine a defect cycle indicates that the diagnosis can be performed on a sheet with a width of 21.0 cm or more. For each setting selected in step S706, a correction value is obtained, and the sheet matching conditions are changed to the longest sub-scanning width among the obtained sub-scanning widths.

TABLE 2

| Color to be Diagnosed | Diagnosis Items | Sub-scanning Width |
|---|---|---|
| C | Charging | 28.8 cm or more |
| M | | 28.8 cm or more |
| Y | | 28.8 cm or more |
| K | | 42.0 cm or more |
| . | . | . |
| . | . | . |
| . | . | . |
| C | Scanning Device | 21.0 cm or more |
| M | | 21.0 cm or more |
| Y | | 21.0 cm or more |
| K | | 21.0 cm or more |

In step S703, determination processing based on the matching conditions is performed as in the first exemplary embodiment. The processing to be performed after the matching conditions are corrected is similar to that according to the first exemplary embodiment, and thus a description thereof is omitted. While the present exemplary embodiment describes an example where the matching conditions are commonly set for all test charts, it may be more preferable to determine the matching conditions for each coloring material and to change the matching conditions for each coloring material to be used for the test charts.

As described above, the matching conditions appropriate for the charts for diagnosis are corrected in consideration of the diagnosis items selected by the user, and are corrected to be eased. This enables the user to select a feeding deck that satisfies the corrected matching conditions and to select a more appropriate feeding deck that satisfies the diagnosis conditions.

The present exemplary embodiment describes an example where nothing is selected in an initial state as illustrated in FIG. 14 as the example of the screen to receive the diagnosis conditions. However, the present exemplary embodiment is not limited to the above-described example. The user may be prompted to select a feeding deck in a state where some of the conditions are checked as initial values. For example, if an inspection function is also provided and a defect is detected by the inspection function to prompt the user to perform the image diagnosis, a color recommended as the color to be diagnosed for inspection may be checked in advance depending on the color of the defect detected by the inspection function. Further, if a component replacement history is also provided, it is highly likely that a failure has occurred in a component item that has been used for a certain period of time since the last replacement. Accordingly, the initial values for the diagnosis items may be set with reference to the component replacement history.

Image diagnostic processing according to a third exemplary embodiment will be described. The first exemplary embodiment describes the example where a format illustrated in FIG. 6 is used and four test charts for CMYK colors, respectively, are printed using a single-color image with an area ratio of 50%. As described above regarding the matching conditions for sheets in the first exemplary embodiment, a defect is made visible on the test chart for each coloring material, thereby identifying the cycle of defects in one test chart. On the other hand, to reduce an effect due to noise and improve the accuracy of identifying the cycle, it may be desirable to use a plurality of test charts with the same conditions and identify the cycle of defects not only within a page but also between pages. In this case, setting a shorter distance between the charts (hereinafter referred to as a sheet-to-sheet distance) makes it possible to include more cycle candidates using a smaller number of sheets. In the present exemplary embodiment, processing for considering a difference in sheet-to-sheet distance information depending on sheet conditions for sheets contained in each feeding deck in an example where the plurality of test charts with the same conditions is used to identify the cycle of defects between pages will be described.

Figure 15:
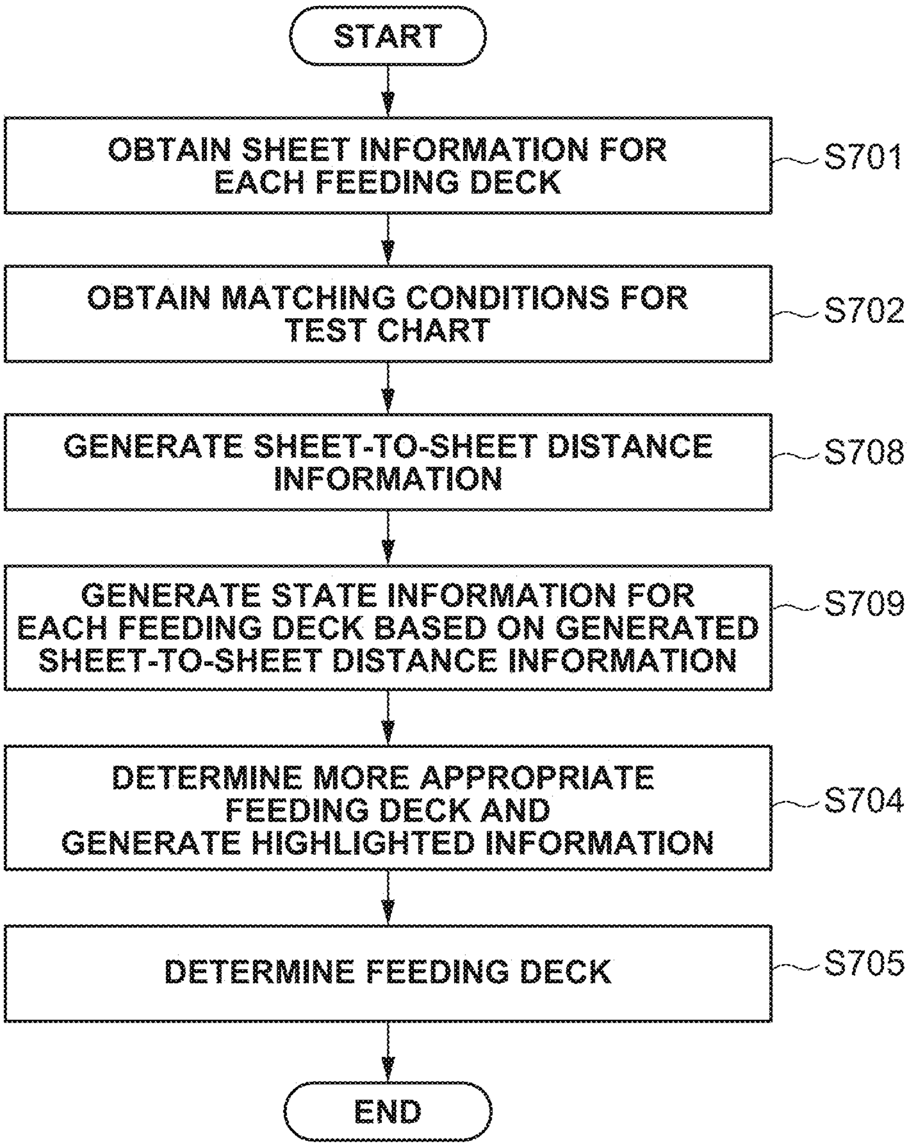
FIG. 15 is a flowchart illustrating a feeding deck determination processing flow according to a third exemplary embodiment.

FIG. 15 illustrates a detailed procedure for image diagnosis setting processing in step S501 according to the third exemplary embodiment. A configuration of the printing system 100 and an image diagnostic processing flow according to the present exemplary embodiment are similar to those of the first exemplary embodiment, and thus descriptions thereof are omitted. Processing in image diagnostic processing steps S708 and S709, which are different from the steps according to the first exemplary embodiment, will be described. Processing in each step illustrated in FIG. 15 is executed by the CPU 214 of the diagnosis unit 108, as in the first exemplary embodiment.

First, in step S708, the CPU 214 determines whether a difference occurs in the sheet-to-sheet distance depending on the grammage of sheets held in advance and the sheet information for each feeding deck obtained in step S701. If the sheet-to-sheet distance changes, sheet-to-sheet distance information indicating "1" is generated for each feeding deck, and if the sheet-to-sheet distance does not change, sheet-to-sheet distance information indicating "0" is generated for each feeding deck. The generated sheet-to-sheet distance information is stored in the HDD unit 208. For example, if thick paper with a greater grammage is used, a conveyance speed may be lowered and a longer sheet-to-sheet distance may be set to thereby secure time for fixing coloring materials by fixation processing. Accordingly, in the present exemplary embodiment, it is determined whether a feeding deck contains sheets with a grammage of 201 $g/m^2$ or more (thick paper 2) for which the sheet-to-sheet distance is increased. If the thick paper 2 is contained in the feeding deck, the sheet-to-sheet distance information for the corresponding feeding deck is set to "1". After the sheet-to-sheet distance information is generated, the processing proceeds to step S709.

In step S709, as in the first exemplary embodiment, the CPU 214 compares the sheet information with matching conditions and also generates state information in consideration of the sheet-to-sheet distance information generated in step S708. State information generation processing of the present exemplary embodiment differs from that of the first exemplary embodiment in that the sheet-to-sheet distance information is taken into consideration. In step S709, logical AND processing between the state information generated in processing similar to that in the first exemplary embodiment and the sheet-to-sheet distance information generated in step S708, and the state information is corrected. Specifically, state information indicating "1" is stored in the HDD unit 208 only when the state information generated by using the procedure illustrated in FIG. 9 indicates "1" and the sheet-to-sheet distance information indicates "1".

As described above, a feeding deck is selected in consideration of not only the sheet conditions appropriate for the chart for diagnosis, but also the sheet-to-sheet distance information for each feeding deck. Taking the sheet-to-sheet distance information into consideration makes it possible to improve the diagnosis accuracy without the need for preparing the plurality of test charts with the same conditions and without the use of unnecessary sheets to determine the cycle of detects between pages.

While the present exemplary embodiment describes the example where it is determined whether a change in the sheet-to-sheet distance occurs depending on the grammage in the sheet information, a condition that may cause the change in the sheet-to-sheet distance is not limited to that in the above-described example. In an apparatus configuration in which the sheet-to-sheet distance changes depending on the surface property in the sheet information, it is desirable to determine the sheet-to-sheet distance information by including the surface property. In an apparatus configuration in which the sheet-to-sheet distance changes depending on the position of the feeding deck, it is desirable to generate the sheet-to-sheet distance information by including the position of each feeding deck in addition to the sheet information.

Image diagnostic processing according to a fourth exemplary embodiment will be described. The first to third exemplary embodiments each describe an example of the image forming apparatus including only image diagnostic processing as an image adjustment means. However, the effects of the present exemplary embodiment are not limited to the above-described example. If an image adjustment means other than the image diagnostic processing is provided, a criterion for selecting the feeding deck different from that in the image diagnostic processing may be provided to select a feeding deck.

Figure 16:
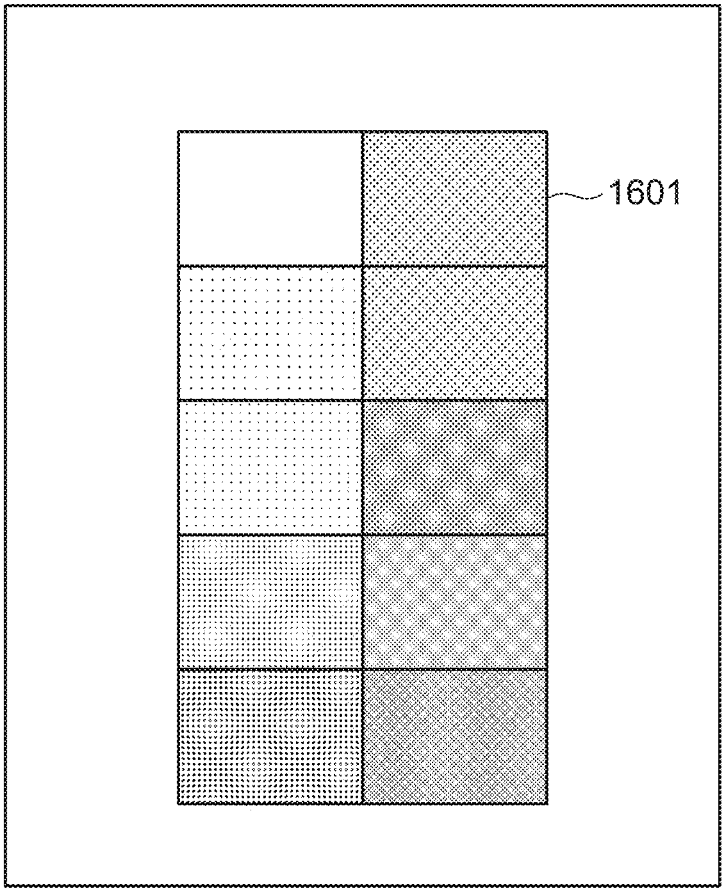
FIG. 16 illustrates an example of a test chart to be used for an image adjustment means different from the image diagnostic processing.

In the present exemplary embodiment, an example where a density adjustment means that corrects a reproduction density for an input signal value is provided to adjust a hue in the printing unit 107 as an image adjustment means different from the image diagnostic processing will be described. FIG. 16 illustrates a schematic diagram of a test chart to be used for the density adjustment means. As indicated by a portion 1601, an image portion where the amount of coloring material is changed is printed by the printing unit 107 and is scanned by the image scanning unit 331 or 332. The printing unit 107 is adjusted to correct a difference between the expected scanning signal value and the signal value of the scanned image based on the scanned image data. Four test charts for CMYK colors, respectively, are prepared, as in the image diagnostic processing.

In the density adjustment means, the sheet size, the grammage, the surface property, and the sheet color are set as conditions appropriate for the test charts, as in the image diagnostic processing. However, the density adjustment means is a means for adjusting a difference in density reproducibility that occurs due to differences in the grammage or the surface property between a sheet the user wants to use and an already set sheet. Accordingly, it is desirable to set the same conditions with regard to the grammage and the surface property as the sheet to be used after adjustment by the user.

On the other hand, in the image diagnostic processing, as described in the first exemplary embodiment, it is important to make a defect generated due to a failure in the printing unit 107 visible. The image diagnostic processing desirably uses sheets with the grammage and the surface property with which a defect can be accurately detected, i.e., sheets with a wide main scanning width and a long sub-scanning width as a sheet size, and more desirably, uses sheets with a high degree of whiteness and high surface uniformity. Table 3 below illustrates a comparison of matching conditions between the image diagnostic processing and the density adjustment means. As illustrated in Table 3, a feeding deck is selected based on the matching conditions that are different between the image diagnostic processing and the density adjustment means. For example, the density adjustment means can use a sheet with a length of 21 cm or more in the sub-scanning direction, which is shorter than that in the image diagnostic processing, as the sheet size. It is desirable that the user designates the grammage and the surface property in the density adjustment means. In correction processing by the density adjustment means, it is desirable to prompt the user to select a sheet with the same grammage and the same surface property as those of a sheet to be used after adjustment by the user. Specifically, unlike in step S704 in the first exemplary embodiment, a configuration for selecting an appropriate feeding deck based only on the sheet information is not used. Further, a configuration for searching for a feeding deck with higher accuracy is not used.

TABLE 3

| | Sheet Size | Grammage | Surface Property | Sheet Color |
|---|---|---|---|---|
| Image diagnostic processing | 11 inches or more in main scanning direction 42 cm or more in sub-scanning direction | 200 g/m$^2$ or less (conditions to be set without increasing sheet-to-sheet distance) | Sheet other than embossed paper and film paper | White |
| Density adjustment means | 11 inches or more in main scanning direction 21 cm or more in sub-scanning direction | Designated by user | Designated by user | White |

As described above, if image diagnostic processing an image adjustment means other than the image diagnostic processing are provided, a feeding deck is selected based on a criterion different from that used in the image diagnostic processing in the image adjustment means other than the image diagnostic processing.

Effects

As described above in the exemplary embodiments, it is determined whether a sheet contained in each feeding deck satisfies the matching conditions based on the sheet conditions appropriate for a chart for diagnosis. Further, a notification indicating an appropriate feeding deck among feeding decks that satisfy the matching conditions is issued to the user, or the appropriate feeding deck is automatically selected. This configuration facilitates the user to determine the appropriate feeding deck for the image diagnostic processing, thereby reducing the number of steps for the user to take in selecting a feeding deck. Furthermore, it is possible to prevent deterioration in diagnosis accuracy due to printing the chart using a sheet that less satisfies the matching conditions.

According to an aspect of the present disclosure, it is possible to easily select a feeding deck containing a recording sheet appropriate for determination of a defective part in an image forming unit.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2023-072911, filed Apr. 27, 2023, which is hereby incorporated by reference herein in its entirety.

What is claimed is:

1. An image forming apparatus comprising:
- a plurality of feeding decks each containing a recording sheet;
- a display unit configured to display information;
- an image forming unit configured to form an image on the recording sheet, the image forming unit including a plurality of parts;
- a scanning unit configured to scan the image formed by the image forming unit;
- one or more processors and one or more memories configured to cooperate to:
  - perform control to display information about the plurality of feeding decks on the display unit;
  - select a feeding deck from among the plurality of feeding decks based on a user instruction; and
  - cause the image forming unit to form the image on the recording sheet conveyed from the selected feeding deck; and
- a diagnostic arrangement including the scanning unit configured to diagnose a defective part in the image forming unit based on an image obtained by scanning, by the scanning unit, the recording sheet on which the image has been formed,
- wherein, when the user is prompted to select the feeding deck from among the plurality of feeding decks for diagnosing the defective part in the image forming unit by the diagnostic arrangement, a feeding deck containing a recording sheet appropriate for diagnosing the defective part in the image forming unit is displayed on the display unit in a highlighted manner.

2. The image forming apparatus according to claim 1, wherein the one or more processors and the one or more memories further cooperate to:
- obtain information about a recording sheet contained in each of the plurality of feeding decks, and
- display a feeding deck containing a recording sheet appropriate for diagnosing the defective part in the image forming unit on the display unit in a highlighted manner based on the obtained information.

3. The image forming apparatus according to claim 2, wherein the information about the recording sheet includes at least one of a size of the recording sheet, a grammage of the recording sheet, a surface property of the recording sheet, and color of the recording sheet.

4. The image forming apparatus according to claim 1, wherein the one or more processors and the one or more memories further cooperate to control the display unit to prevent a feeding deck containing a recording sheet with different surface properties on front and back surfaces thereof from being selected from among the plurality of feeding decks.

5. The image forming apparatus according to claim 1, wherein the image is a chart image.

6. The image forming apparatus according to claim 1, wherein the one or more processors and the one or more memories further cooperate to perform control to display a feeding deck containing a recording sheet appropriate for diagnosing the defective part in the image forming unit on the display unit in a highlighted manner based on a diagnosis item to be diagnosed by the diagnostic arrangement.

7. The image forming apparatus according to claim 1, wherein the one or more processors and the one or more memories further cooperate to perform control to display a feeding deck containing a recording sheet appropriate for diagnosing the defective part in the image forming unit on the display unit in a highlighted manner based on sheet-to-sheet distance information for each of the plurality of feeding decks.

8. The image forming apparatus according to claim 1, wherein sheet-to-sheet distance information is determined for each of the plurality of feeding decks and is displayed in a highlighted manner based on at least one of a feeding deck number and a grammage of the recording sheet contained in each of the plurality of feeding decks.

9. A method for controlling an image forming apparatus, the image forming apparatus including a plurality of feeding decks each containing a recording sheet, a display unit configured to display information, an image forming unit configured to form an image on the recording sheet conveyed from one of the plurality of feeding decks, the image forming unit including a plurality of parts, and a scanning unit configured to scan the image formed by the image forming unit, the method comprising:
- performing control to display information about the plurality of feeding decks on the display unit;
- selecting a feeding deck from among the plurality of feeding decks based on a user instruction; and
- causing the image forming unit to form the image on the recording sheet conveyed from the selected feeding deck; and
- diagnosing a defective part in the image forming unit based on an image obtained by scanning, by the scanning unit, the recording sheet on which the image has been formed,
- wherein in the performing control, when the user is prompted to select the feeding deck from among the plurality of feeding decks for diagnosing the defective part in the image forming unit by a diagnosis unit a feeding deck containing a recording sheet appropriate for diagnosing the defective part in the image forming unit is displayed on the display unit in a highlighted manner.

10. The method according to claim 9, further comprising obtaining information about a recording sheet contained in each of the plurality of feeding decks, wherein in performing control, a feeding deck containing a recording sheet appropriate for diagnosing the defective part in the image forming unit is displayed on the display unit in a highlighted manner based on the obtained information.

11. The method according to claim 10, wherein the information about the recording sheet includes at least one of a size of the recording sheet, a grammage of the recording sheet, a surface property of the recording sheet, and color of the recording sheet.

12. The method according to claim 9, wherein in the performing control, the display unit is controlled to prevent a feeding deck containing a recording sheet with different surface properties on front and back surfaces thereof from being selected from among the plurality of feeding decks.

13. The method according to claim 9, wherein the image is a chart image.

14. The method according to claim 9, wherein in the performing control, a feeding deck containing a recording sheet appropriate for diagnosing the defective part in the image forming unit is displayed on the display unit in a highlighted manner based on a diagnosis item to be diagnosed in the diagnosing.

15. The method according to claim 9, wherein in the performing control, a feeding deck containing a recording sheet appropriate for diagnosing the defective part in the image forming unit is displayed on the display unit in a highlighted manner based on sheet-to-sheet distance information for each of the plurality of feeding decks.

* * * * *